US011835400B2

(12) United States Patent
Tu et al.

(10) Patent No.: US 11,835,400 B2
(45) Date of Patent: Dec. 5, 2023

(54) FORCE-MEASURING DEVICE TESTING SYSTEM, FORCE-MEASURING DEVICE CALIBRATION SYSTEM, AND A METHOD OF CALIBRATING A FORCE-MEASURING DEVICE

(71) Applicant: UltraSense Systems, Inc., San Jose, CA (US)

(72) Inventors: Zhongxuan Tu, Shanghai (CN); Deliang Tao, Shanghai (CN); Chunlei Qian, Shanghai (CN); Sina Akhbari, San Jose, CA (US); Hao-Yen Tang, San Jose, CA (US)

(73) Assignee: UltraSense Systems, Inc., San Jose, CA (US)

(*) Notice: Subject to any disclaimer, the term of this patent is extended or adjusted under 35 U.S.C. 154(b) by 11 days.

(21) Appl. No.: 17/205,728

(22) Filed: Mar. 18, 2021

(65) Prior Publication Data

US 2021/0293648 A1    Sep. 23, 2021

Related U.S. Application Data

(60) Provisional application No. 62/991,433, filed on Mar. 18, 2020.

(51) Int. Cl.
*G01L 5/167* (2020.01)
*G01L 25/00* (2006.01)
(Continued)

(52) U.S. Cl.
CPC ............. *G01L 5/167* (2013.01); *G01L 1/16* (2013.01); *G01L 25/00* (2013.01); *G01L 27/002* (2013.01); *G06F 3/0418* (2013.01)

(58) Field of Classification Search
CPC .......... G01L 5/167; G01L 1/16; G01L 25/00; G01L 27/002; G01L 1/255; G06F 2203/04105; G06F 3/044
See application file for complete search history.

(56) References Cited

U.S. PATENT DOCUMENTS 4,412,544 A    11/1983  Beretsky et al.
4,493,220 A *   1/1985  Carignan ................ G01L 1/225
                                                    73/862.635
(Continued)

FOREIGN PATENT DOCUMENTS

WO    WO2018077761       5/2018
WO    WO-2019014458 A1 *  1/2019

*Primary Examiner* — Alesa Allgood
*Assistant Examiner* — Sangkyung Lee
(74) *Attorney, Agent, or Firm* — Perkins Coie LLP

(57) ABSTRACT

A force-measuring device testing system is disclosed. A linear actuator assembly includes a Z-axis actuator and a slider. A load cell is secured to the slider, such that actuation of the Z-axis actuator is mechanically coupled to a vertical movement of the load cell via the slider. The load cell is configured to impart a time-varying applied force to the sample which includes a force-measuring device. A load cell signal processing circuitry is configured to measure force signals at the load cell and output amplified force signals to the controller. The controller is configured to repeatedly carry out the following until a desired force trajectory has been executed: (1) calculate digital force signals in accordance with the amplified force signals, (2) calculate a next actuation of the Z-axis actuator in accordance with a desired force trajectory and an elastic parameter, and (3) control the actuation of the Z-axis actuator in accordance with its next calculated actuation.

16 Claims, 30 Drawing Sheets

(51) Int. Cl.
  *G01L 1/16* (2006.01)
  *G01L 27/00* (2006.01)
  *G06F 3/041* (2006.01)

(56) References Cited

U.S. PATENT DOCUMENTS

| | | |
|---|---|---|
| 8,676,540 B1 | 3/2014 | Welch et al. |
| 10,466,844 B1 | 10/2019 | Tang et al. |
| 10,585,534 B2 | 3/2020 | Tang et al. |
| 10,719,175 B2 | 7/2020 | Akhbari et al. |
| 10,775,938 B2 | 9/2020 | Tang et al. |
| 2001/0000666 A1 | 5/2001 | Wood et al. |
| 2002/0005108 A1 | 1/2002 | Ludwig |
| 2003/0144814 A1 | 7/2003 | Hama et al. |
| 2003/0217873 A1 | 11/2003 | Paradiso et al. |
| 2003/0233233 A1 | 12/2003 | Hong |
| 2007/0260425 A1 | 11/2007 | Kim |
| 2008/0316184 A1 | 12/2008 | D'Souza |
| 2009/0157206 A1 | 6/2009 | Weinberg et al. |
| 2009/0224161 A1 | 9/2009 | Fritsch et al. |
| 2010/0117993 A1 | 5/2010 | Kent |
| 2010/0139991 A1 | 6/2010 | Phillip et al. |
| 2010/0258361 A1 | 10/2010 | Yamauchi et al. |
| 2011/0061464 A1 | 3/2011 | Yi-min |
| 2011/0288791 A1* | 11/2011 | Jeppesen .................. G01N 3/38 702/42 |
| 2012/0274609 A1 | 11/2012 | Sheng et al. |
| 2013/0345864 A1 | 12/2013 | Park et al. |
| 2014/0022189 A1 | 1/2014 | Sheng et al. |
| 2014/0071095 A1 | 3/2014 | Godsill |
| 2015/0148674 A1 | 5/2015 | Park et al. |
| 2015/0169136 A1 | 6/2015 | Ganti et al. |
| 2016/0216794 A1 | 7/2016 | Yoon et al. |
| 2016/0246449 A1 | 8/2016 | Jarske |
| 2017/0110504 A1 | 4/2017 | Panchawagh et al. |
| 2017/0255338 A1 | 9/2017 | Medina |
| 2017/0322290 A1 | 11/2017 | Ng et al. |
| 2017/0336903 A1 | 11/2017 | Rivaud et al. |
| 2017/0336926 A1 | 11/2017 | Chaudhri et al. |
| 2018/0032161 A1 | 2/2018 | Shi et al. |
| 2018/0032211 A1 | 2/2018 | King |
| 2018/0039392 A1 | 2/2018 | Kim et al. |
| 2018/0113039 A1* | 4/2018 | Drueding ............... G01L 5/1627 |
| 2018/0164937 A1 | 6/2018 | Lynn |
| 2018/0246612 A1 | 8/2018 | Lynn et al. |
| 2018/0276439 A1 | 9/2018 | Strohmann et al. |
| 2018/0276440 A1 | 9/2018 | Strohmann et al. |
| 2018/0284892 A1 | 10/2018 | Kwon et al. |
| 2018/0323783 A1 | 11/2018 | Bang et al. |
| 2019/0000388 A1* | 1/2019 | Anumba ............... A61B 5/0538 |
| 2019/0050618 A1 | 2/2019 | Khuri-Yakub |
| 2019/0074833 A1 | 3/2019 | Sheng |
| 2019/0354209 A1 | 11/2019 | Tang et al. |
| 2019/0354210 A1 | 11/2019 | Akhbari et al. |
| 2019/0354237 A1 | 11/2019 | Tang et al. |
| 2019/0354238 A1 | 11/2019 | Akhbari et al. |
| 2021/0293641 A1 | 9/2021 | Tu et al. |

* cited by examiner

FORCE-MEASURING DEVICE TESTING SYSTEM, FORCE-MEASURING DEVICE CALIBRATION SYSTEM, AND A METHOD OF CALIBRATING A FORCE-MEASURING DEVICE

CROSS-REFERENCE TO RELATED APPLICATION(S)

This application claims the benefit of U.S. Provisional Patent Application No. 62/991,433 filed on Mar. 18, 2020, entitled FORCE-MEASURING DEVICE TESTING SYSTEM, FORCE-MEASURING DEVICE CALIBRATION SYSTEM, AND A METHOD OF CALIBRATING A FORCE-MEASURING DEVICE, which is incorporated herein in its entirety.

BACKGROUND

With advancements in microelectromechanical systems (MEMS) technologies, it has become possible to fabricate MEMS chips containing piezoelectric micromechanical force-measuring elements (PMFEs). MEMS chips containing PMFEs are examples of force-measuring devices. Electronic apparatuses incorporating force-measuring devices can be manufactured. Accordingly, systems and methods for calibrating force-measuring devices and systems and methods for mapping force transmission to force-measuring devices are desired.

SUMMARY OF THE INVENTION

In one aspect, a force-measuring device testing system includes: a linear actuator assembly including a Z-axis actuator and a slider, a load cell secured to the slider, and a sample stage configured to retain a sample including a force-measuring device. Actuation of the Z-axis actuator is mechanically coupled to a vertical movement of the load cell via the slider.

In another aspect, the force-measuring device testing system includes a controller and a load cell signal processing circuitry. The controller is electronically coupled to the Z-axis actuator. The load cell signal processing circuitry is electronically coupled to the load cell and the controller and is configured to measure force signals at the load cell and output amplified force signals to the controller. The load cell is configured to impart a time-varying applied force, during the vertical movement of the load cell, to the sample. The controller is configured to repeatedly carry out the following until a desired force trajectory has been executed: (1) calculate digital force signals in accordance with the amplified force signals, (2) calculate a next actuation of the Z-axis actuator in accordance with a desired force trajectory and the elastic parameter; and (3) control the actuation of the Z-axis actuator in accordance with its next calculated actuation.

In yet another aspect, a method of calibrating a force-measuring device is disclosed. The method includes the following: (A) configuring a force-measuring device testing system, (B) configuring a sample including a force-measuring device, (C) obtaining a desired force-trajectory, (D) operating the force-measuring device testing system, (E) reading, by a force-measuring device controller, a digital transducer data output from a signal processing circuitry of the force-measuring device when the time-varying applied force is imparted to the sample; and (F) adjusting or selecting, by the force-measuring device controller, a gain of the force-measuring device in accordance with the digital transducer data.

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION OF ILLUSTRATIVE EMBODIMENTS

The present disclosure relates to a force-measuring device testing system, a force-measuring device calibration system, and a method of calibrating a force-measuring device.

In this disclosure:

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

Figure 20:
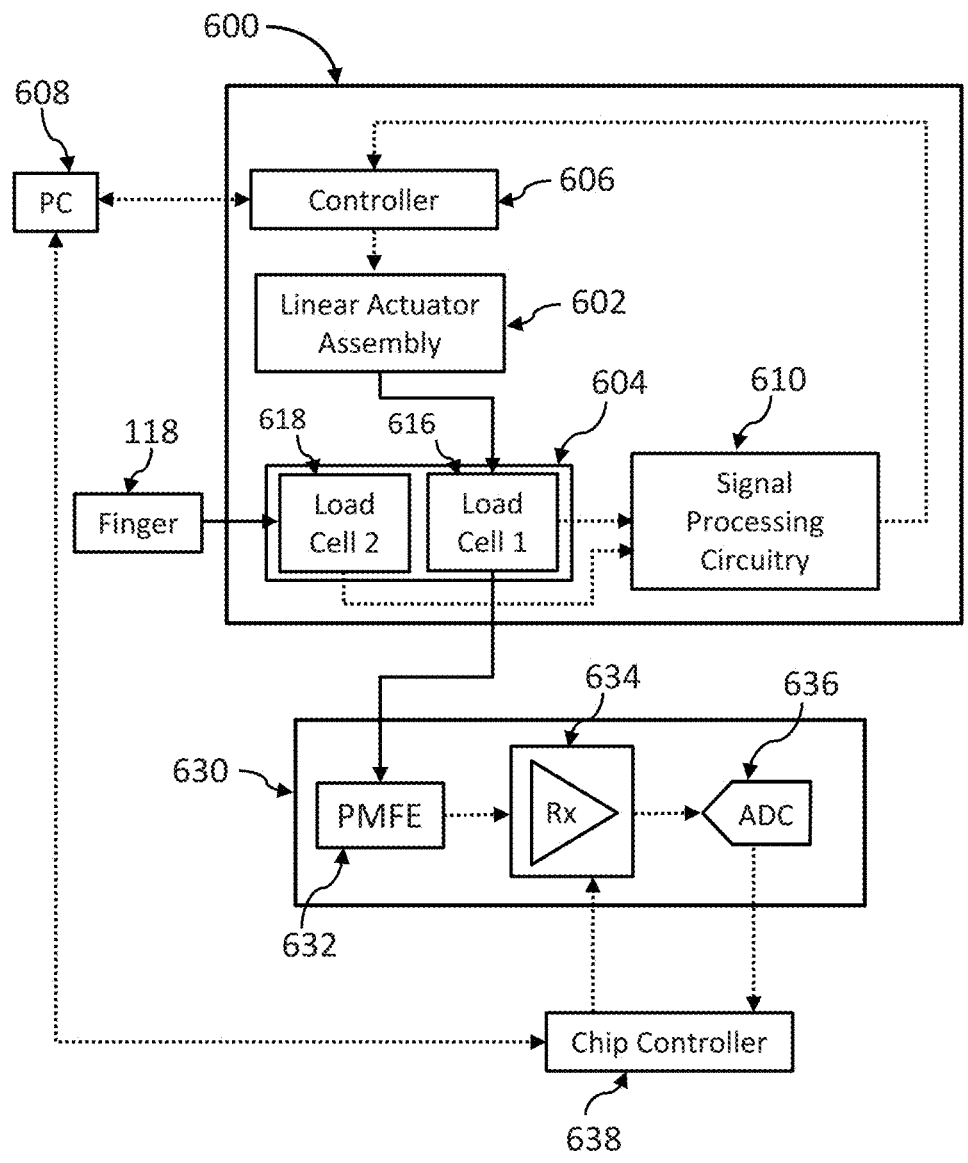
FIG. 20 is a schematic block diagram showing an arrangement of a force-measuring device testing system, a force-measuring device, and a force-measuring device controller.

FIG. 20 is a schematic block diagram showing an arrangement of a testing system 600, a force measuring device 630, and a force-measuring device controller 638. Generally, the testing system 600 can be referred to as a force-imparting system, used to impart a force to any sample. A sample means any test sample that can be tested in the testing system. When the sample includes the force-measuring device 630, the testing system 600 can be referred to as a force-measuring device testing system. For example, a sample can be an electronic apparatus including a cover layer and at least one force-measuring device, with the cover layer attached to the force-measuring device(s). Some examples of samples are a smartphone (640 of FIG. 26) and a touch-panel user-input system (500 of FIG. 16). A combination of the force-measuring device testing system 600 and the force-measuring device controller 638 is referred to as a force-measuring device calibration system. For example, such a calibration system could be controlled from a computer 608.

Figure 23:
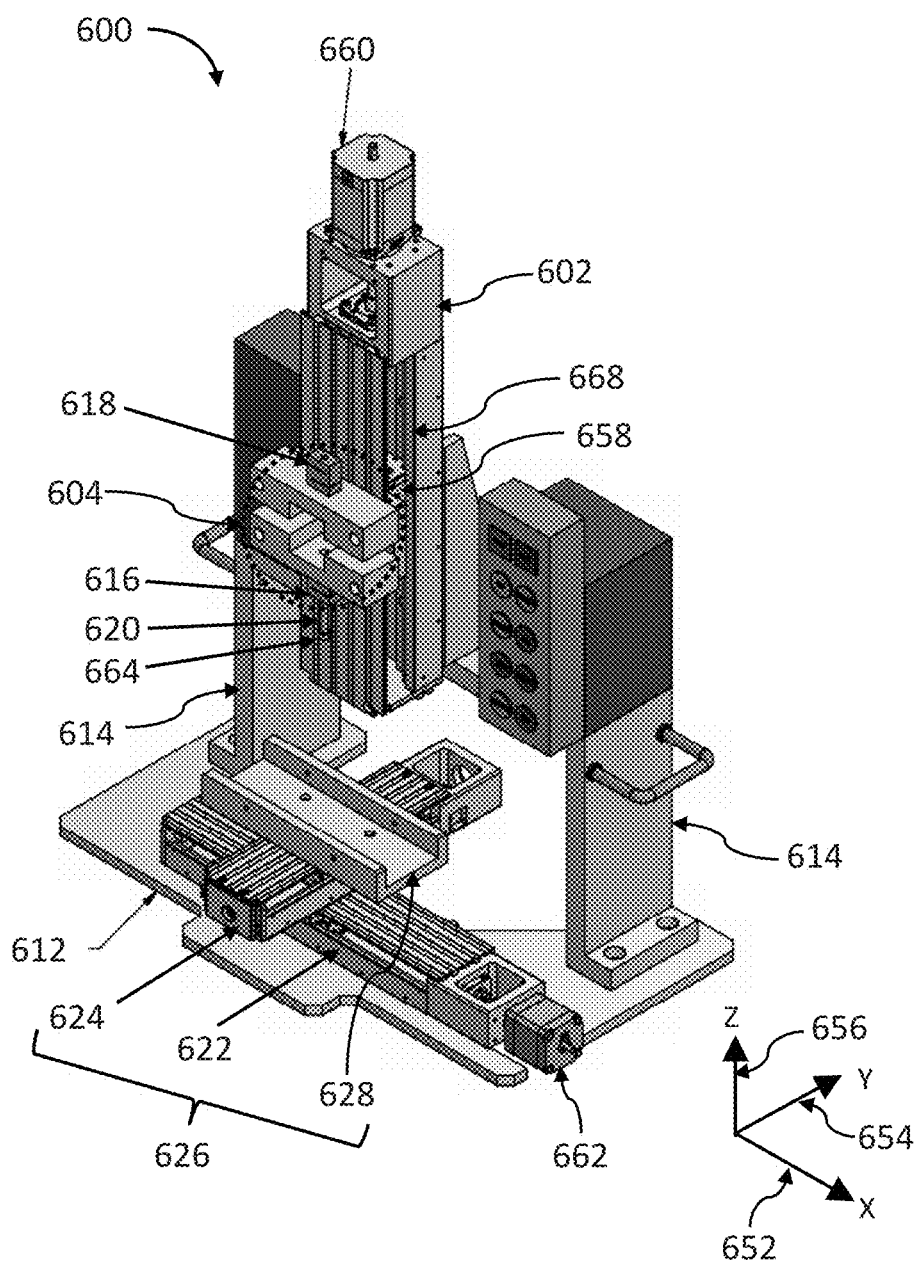
FIG. 23 is a schematic perspective view of a force-measuring device testing system.

An example of a testing system 600 is shown in perspective view in FIG. 23. The testing system 600 includes a base 612, a support structure 614 attached to the base 612, a linear actuator assembly 602 suspended by the support structure 614, and a sample stage 626 mounted on the base 612. In the example shown, the sample stage 626 includes a sample holder 628. First load cell 616 (bottom load cell) and second load cell 618 (top load cell) (collectively referred to as load cells 604) are secured to the slider 658. In the example shown, the support structure 614 consists of two parts, the respective parts being located to the right and to the left of the linear actuator assembly (along the X-axis 652). Both parts of the support structure 614 support the linear actuator assembly 602. The linear actuator assembly 602 includes a Z-axis actuator 660 and a slider 658. In the example shown, the Z-axis actuator 660 is a stepper motor. In the linear actuator assembly 602, a rotation of the Z-axis actuator 660 is converted into linear motion of a slider 658 along a linear guide 668. As shown in FIG. 23, the slider 658 moves along a vertical axis (Z-axis 656). In the example shown, the sample stage 626 includes a Y-axis positioner 624 mounted on top of an X-axis positioner 622 and the sample holder 628 mounted on top of the Y-axis positioner 624. The X-axis positioner 622 is shown to include an X-axis actuator 662. For example, if the sample holder 628 retains multiple samples arrayed along the X-axis 652, the testing system can actuate the X-axis actuator 662 of the X-axis positioner 622 to displace each sample to a specific location under the first load cell 616 for testing.

Figure 24:
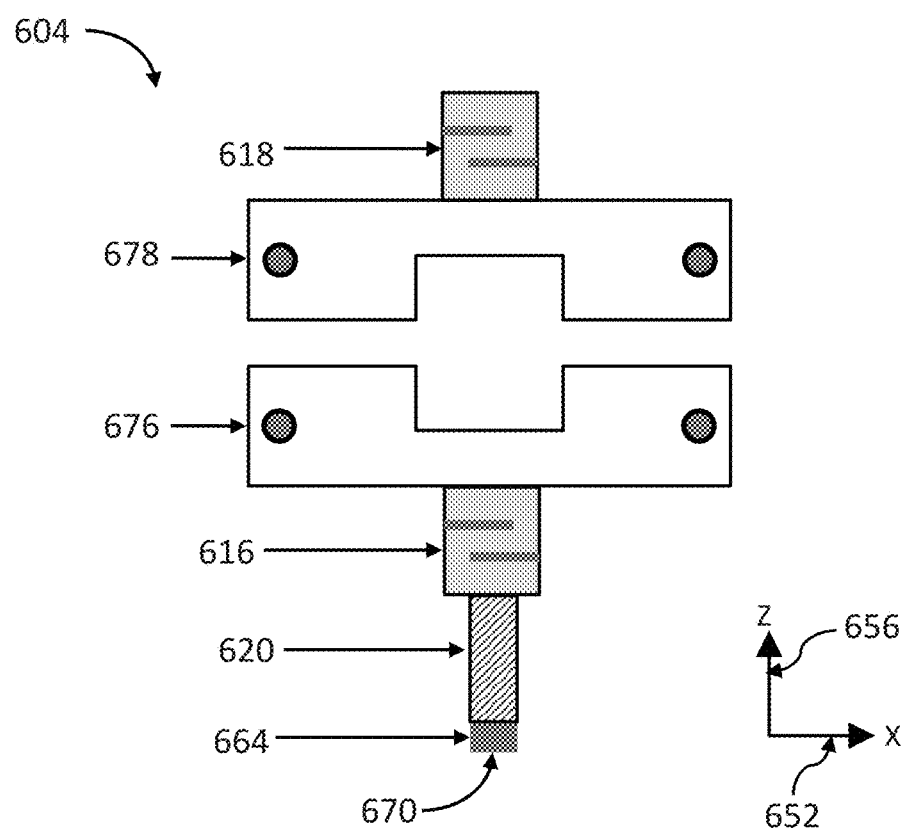
FIG. 24 is a schematic elevational view of load cells and associated components.

The load cells 604 and associated components are schematically shown in elevational view in FIG. 24. A top end of a first load cell 616 is secured to a first fixing element 676, which is secured to the slider 658 (FIG. 23). Actuation of the Z-axis actuator 602 is mechanically coupled to a vertical movement (along the Z-axis 656) of the first load cell 616 via the slider 658. A top end of a first elastic member 620 is attached to a bottom end of the first load cell 616, and a top end of a second elastic member 664 is attached to a bottom end of the first elastic member 620. During operation of the test system 600 in a force-imparting mode, a bottom end 670 of the second elastic member 664 is brought into contact with (impacts) a sample (e.g., a sample containing a force-measuring device). The first elastic member 620 and the second elastic member 664 are arranged in series between the first load cell 616 and the sample when the sample is retained in the sample holder. In the example shown, the first elastic member 620 includes a steel spring and the second elastic member 664 is a rubber block. The first elastic member is less elastic than the second elastic member. We have found that if no elastic member is inserted between the first load cell 616 and the sample, the landing of the first load cell 616 on the sample is highly impulsive (for example, rapid change from negligible force to excessive force). Additionally, we have found that with a combination of a first elastic member (less elastic, such as a steel spring) and a second elastic member (more elastic, such as a rubber block), the forces applied on the sample can vary gradually from minimum force to maximum force. In the force-imparting mode, the first load cell 616 is configured to impart a time-varying applied force to the sample during the vertical movement of the first load cell, the time-varying applied force being imparted via at least one elastic member positioned between the first load cell and the sample.

Additionally, a second load cell 618 can be used. A bottom end of the second load cell 618 is secured to a second fixing element 678, which is secured to the slider 658. Alternatively, the bottom end of the second load cell can be secured to the first fixing element 676, in which case no second fixing element is needed. The second load cell 618 is secured to the slider 658 such that actuation of the Z-axis actuator is mechanically coupled to a vertical movement (along the Z-axis 656) of the second load cell via the slider. Preferably, the first load cell 616 and the second load cell 618 are chosen to have similar operating characteristics (e.g., be of the same model number from the same manufacturer). The first load cell 616 and the second load cell 618 are oriented in opposite directions along the vertical axis (Z-axis 656). The first load cell 616 has its top end secured to the slider while the second load cell 618 has its bottom end secured to the slider. If a second load cell 618 is not used, the first load cell 616 is sometimes simply referred to as the load cell.

The testing system 600 includes a controller 606 and a load cell signal processing circuitry 610 (FIG. 20). The controller 606 is electronically coupled to the Z-axis actuator 660 of the linear actuator assembly 602. A load cell signal processing circuitry 610 is electronically coupled to the load cells 604 (first load cell 616 and second load cell 618) and the controller 606. The load cell signal processing circuitry 610 preferably includes an instrumentation amplifier. The load cell signal processing circuitry 610 configured to measure first force signals at the first load cell 616 and output first amplified force signals to the controller 606. If a second load cell is present, the load cell signal processing circuitry 610 is electronically coupled to the second load cell and is configured to measure second force signals at the second load cell 618 and output second amplified force signals to the controller 606.

When a first item is electronically coupled to a second item, there is an electronic signaling pathway, such as a wired connection or a wireless connection, between the first and second items. An example of a wired connection is a universal serial bus (USB) connection. In the example shown, a computer 608 is electronically coupled to the controller 606 and a force-measuring device controller 638. The force-measuring device controller 638 is electronically coupled to the force-measuring device 630. The force-measuring device controller 638 supplies electrical power to the force-measuring device 630 and communicates with the force-measuring device 630.

Figure 28:
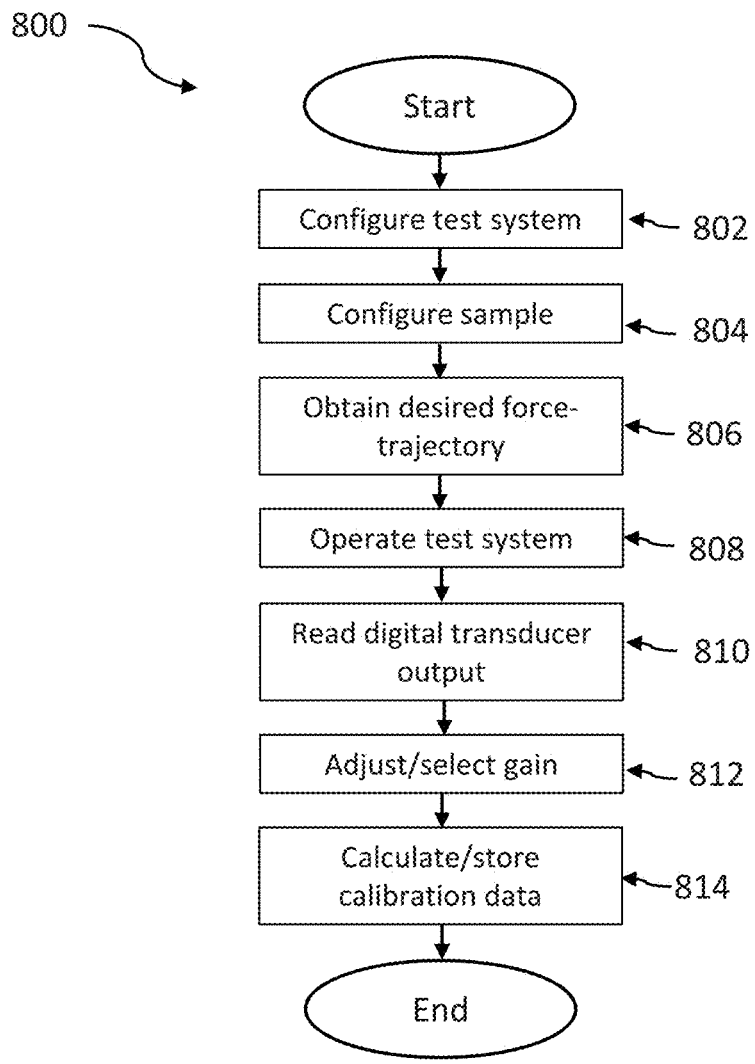
FIG. 28 is a flow diagram of a method of calibrating a force-measuring device.

FIG. 28 is a flow diagram of a method 800 of calibrating a force-measuring device. Method 800 includes steps 802, 804, 806, 808, 810, 812, and 814. At step 802, the force-measuring device testing system (testing system) 600 is configured. As discussed in detail above, the testing system 600 includes: (1) a linear actuator assembly 602 including a Z-axis actuator 660 and a slider 658, (2) a first load cell 616 secured to the slider 658, such that actuation of the Z-axis actuator 660 is mechanically coupled to a vertical movement of the first load cell 616 via the slider 658, (3) a controller 606 electronically coupled to the Z-axis actuator 660, and (4) a load cell signal processing circuitry 610 electronically coupled to the first load cell 616 and the controller 606, configured to measure first force signals at the first load cell 616 and output first amplified force signals to the controller 606.

Figure 25:
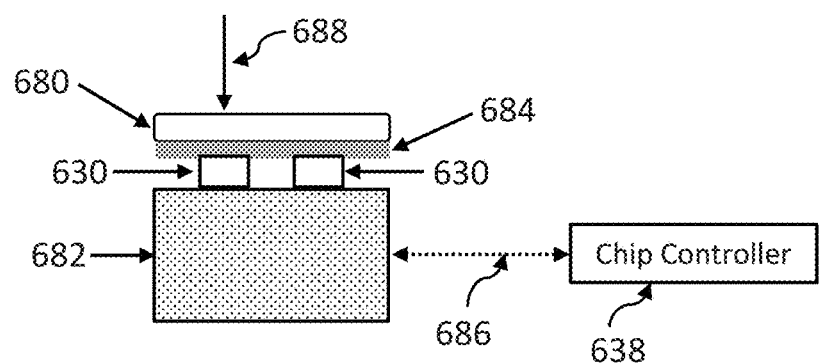
FIG. 25 is a schematic elevational view of an arrangement for testing a force-measuring device.
Figure 26:
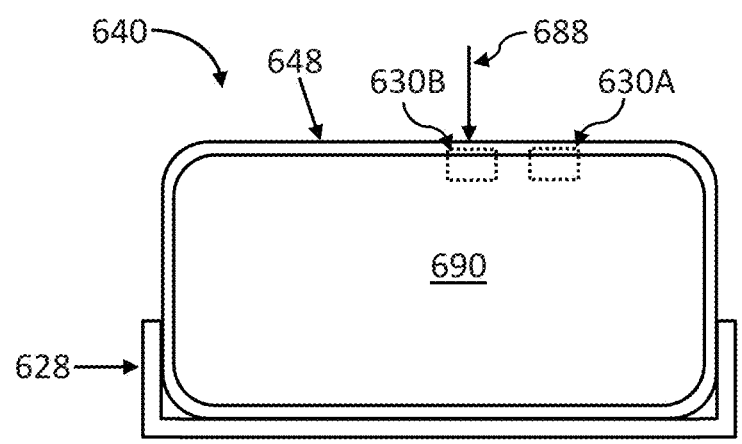
FIG. 26 is a schematic elevational view of an arrangement for testing an electronic apparatus incorporating a force-measuring device.

At step 804 of method 800, a sample stage, a sample including a force-measuring device, and a force-measuring device controller are configured. The sample stage (626 of FIG. 23) retains the sample which includes at least one force-measuring device 630. Each force-measuring device 630 includes a signal processing circuitry. The force-measuring device controller 638 is electronically coupled to the signal processing circuitry of each force-measuring device 630. Examples of possible configurations are shown in FIGS. 25 and 26. In FIG. 25, two force-measuring device 630 are shown, mounted on a chip tester 682, which functions as a sample holder. The chip tester can be mounted to the sample stage 626 (FIG. 23). The force-measuring device 630 can be a packaged integrated circuit (IC). The force-measuring device 630 can contain piezoelectric micromechanical force-measuring elements (PMFEs). Chip tester 682 is electronically coupled, via connection 686, to the force-measuring device controller 638. A direction in which a force from the first load cell is imparted is shown as arrow 688. This force is imparted to a cover layer 680, which is attached to the top surfaces of force-measuring devices 630 via an adhesive layer 684.

In FIG. 26, two force-measuring devices 630A, 630B have been assembled in an electronic apparatus 640. In the example shown, the electronic apparatus 640 is a smartphone which includes a display 690, microprocessor (not shown in FIG. 26), and a memory (not shown in FIG. 26). In the smartphone (or other electronic apparatus), the memory is electronically coupled to the microprocessor. In the example shown, the electronic apparatus 640 is retained by a sample holder 628. The sample holder 628 can be mounted to the sample stage 626. The force-measuring devices 630A, 630B have been incorporated into an interior of the electronic apparatus 640. A direction in which a force from the first load cell is imparted is shown as arrow 688. This force is imparted to an external housing 648 of the electronic apparatus 640. Preferably, the force-measuring devices are attached to an interior surface of the external housing 648 via an adhesive layer. In this case, the external housing functions as a cover layer for the force-measuring devices.

In the example shown in FIG. 20, the force-measuring device 630 includes piezoelectric micromechanical force-measuring elements (PMFEs) 632, amplifiers 634, and analog-to-digital converters (ADCs) 636. The amplifiers 634 and the ADCs 636 are referred to as signal processing circuitry of the force-measuring device 630. When a time-varying force is imparted by the first load cell 616 to the sample at a force-imparting point: (1) there is a low-frequency mechanical deformation propagating in the sample as a result of the applied force; (2) the low-frequency mechanical deformation causes a strain at the PMFEs 632 and voltage signals are generated at the PMFEs 632 in accordance with the strain; (3) amplifiers 634 amplify the voltage signals output from the PMFEs 632 and the ADCs 636 convert the amplified voltage signals from the amplifiers 634 to digital transducer data. Herein, when we refer to voltage signals output from the PMFEs, this may refer to voltage signals from a single PMFE, from multiple PMFEs, or from the outermost electrodes of PMFEs in a set of PMFEs connected in series. Force-measuring device controller 638 is configured to read the digital transducer data output from the signal processing circuitry of the force-measuring device(s), when the time-varying force is imparted to the sample. In the example shown in FIG. 20, the force-measuring device controller 638 reads the digital transducer data from the ADCs 636. As explained hereinbelow, the force-measuring device controller 638 adjusts or selects the gain of the force-measuring device 630 in accordance with the digital transducer data.

Figure 29:
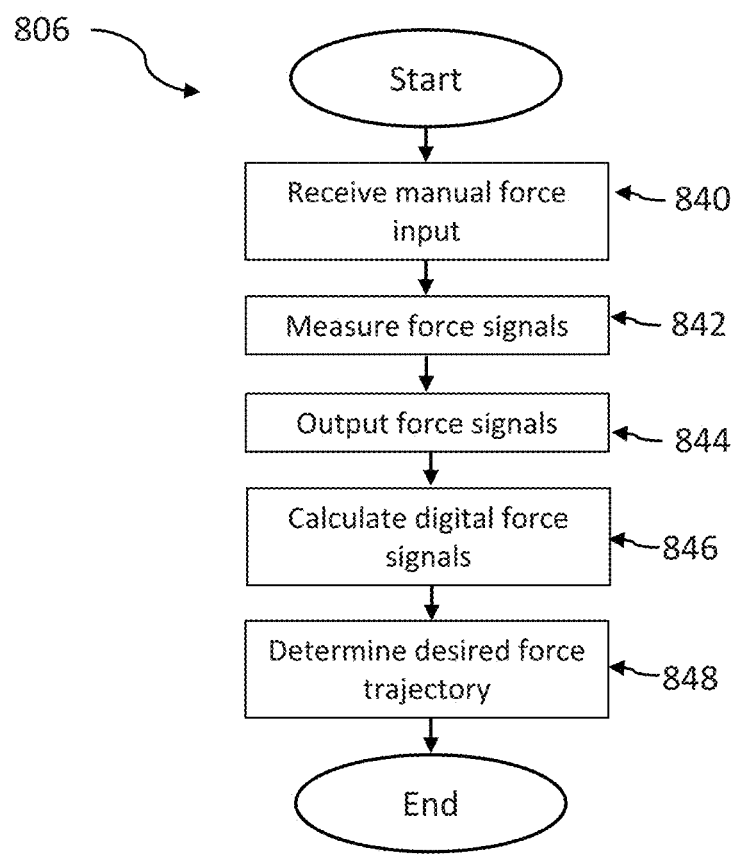
FIG. 29 is a flow diagram of a method of obtaining a desired force-trajectory.

At step 806, a desired force-trajectory is obtained. FIG. 29 is a flow diagram of an example method of obtaining the desired force-trajectory by manual force input, such as a force input by a finger (e.g., finger press) at the second load cell 618. In the example shown, step 806 includes sub-steps 840, 842, 844, 846, and 848. In this manual input mode, the second load cell 618 is used. At sub-step 840, the second load cell 618 receives a manual force input while the first load cell 616, the second load cell 618, and the slider 658 are configured to be stationary during the manual input mode. For example, the actuator 660 is turned off and the slider does not move. For example, the manual force input includes a finger pressing against the second load cell 618 from the top. At sub-step 842, the load cell signal processing circuitry 610 measures second force signals at the second load cell and amplifies the second force signals. At sub-step 844, the load cell signal processing circuitry 610 outputs second amplified force signals to the controller 606. At sub-step 846, the controller obtains digital force signals in accordance with the second amplified force signals. For example, this can include converting the second amplified force signals to digital signals. At sub-step 848, the controller determines the desired force trajectory in accordance with the digital force signals. For example, the controller can determine the digital force signals to be the desired force trajectory or can carry out additional signal processing on the digital force signals. The desired force trajectory can be stored in a memory store for subsequent retrieval and use. Accordingly, after the desired force trajectory has been measured (for example, according to FIG. 29) and stored, step 806 can include retrieving a previously recorded desired force trajectory. Furthermore, the desired force trajectory can be constructed digitally or can be measured at another force sensor different from the second load cell 618.

Figure 30:
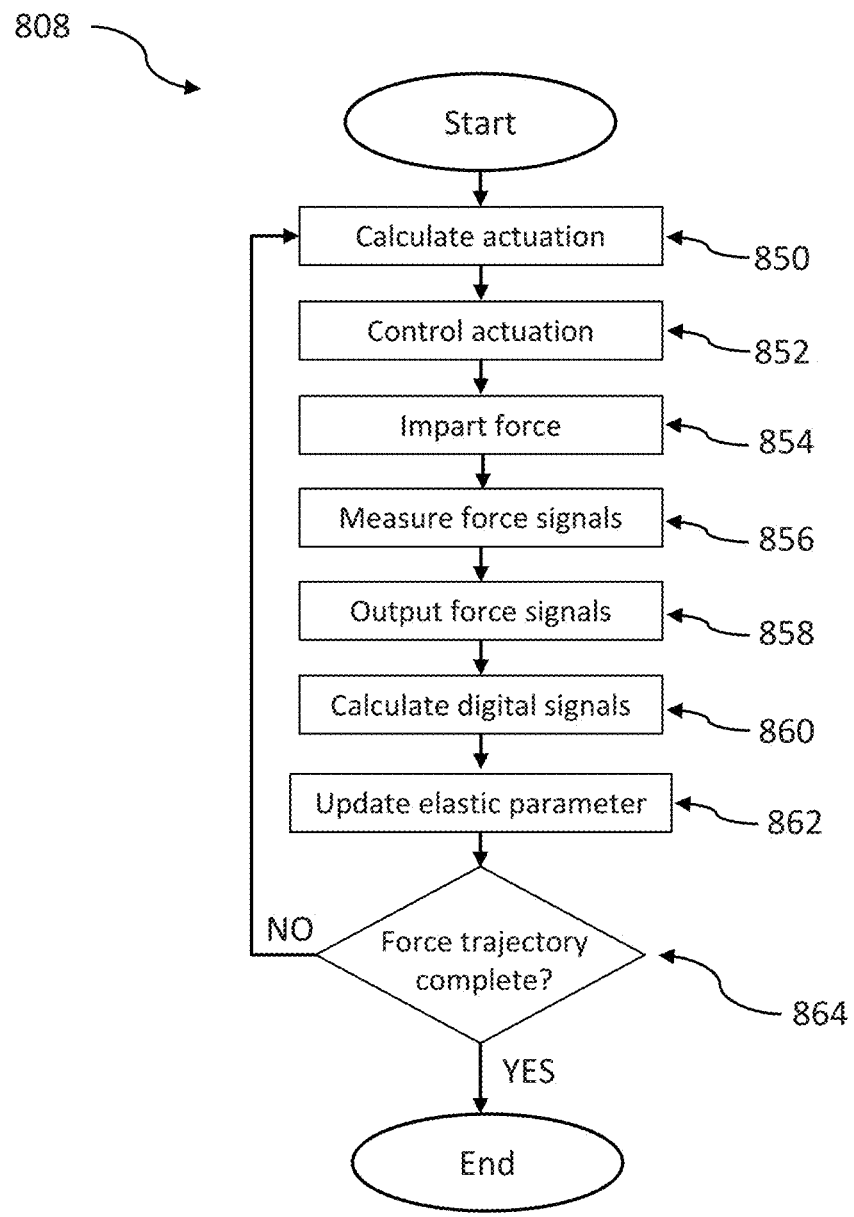
FIG. 30 is a flow diagram of a method of operating a force-measuring device testing system.
Figure 32:
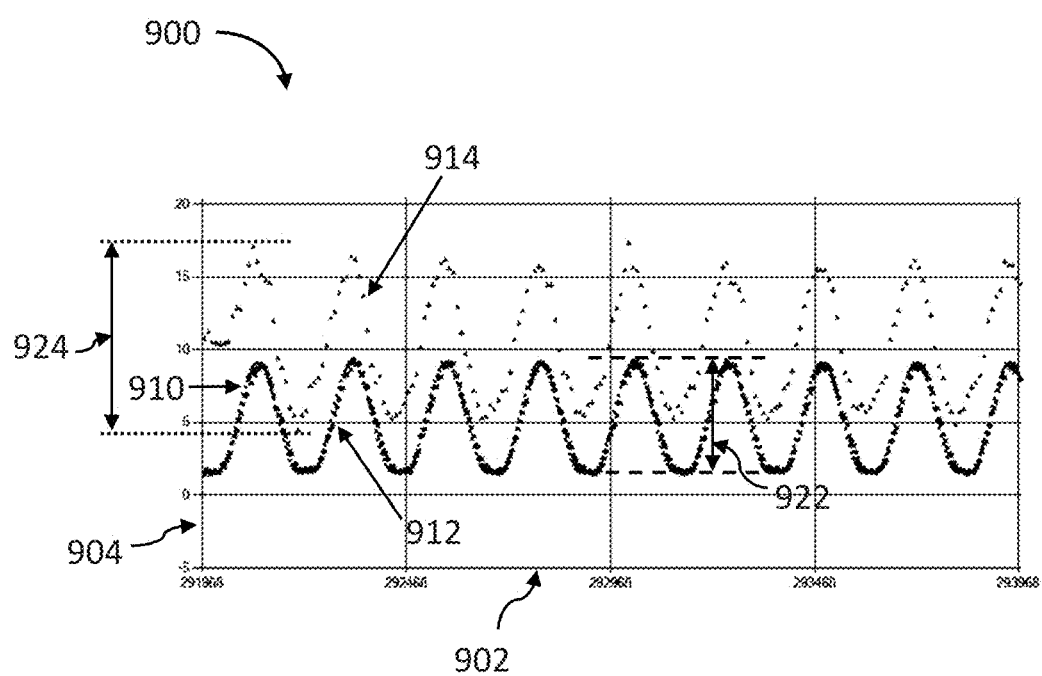
FIG. 32 is a diagram showing graphical plots of a desired force trajectory, digital force signals, and digital transducer data.

At step 808, the testing system 600 is operated. Step 808 of operating the testing system 600 is explained in greater detail in FIG. 30. Step 808 includes sub-steps 850, 852, 854, 856, 858, 860, 862, and 864. At sub-step 850, the controller calculates an actuation of the Z-axis actuator in accordance with the desired force trajectory and an elastic parameter. The controller calculates the number of steps of the stepper motor in the stepper motor's next iteration (cycle). An example of a desired force trajectory is shown in FIG. 32, which shows graphical plots of a desired force trajectory, digital force signals, and digital transducer data. The graphical plots have a horizontal axis 902 which shows time t, in which 1 box corresponds to 500 ms, and a vertical axis 904 which shows force. FIG. 32 is an example output 900 of a user interface on the computer 608. FIG. 32 shows a desired force trajectory 910 (data points shown as circles) which is a sinusoidal wave with an amplitude of 7.5 N and a frequency of 5 Hz. In addition, there is an interval period of 50 ms between adjacent periods at the minimum amplitude. In the case of the desired force trajectory 910, 1 box along the vertical axis 944 corresponds to 5 N. In this case, the desired force trajectory is set by an operator via the user interface on the computer 608. Alternatively, the desired force trajectory can be set by the manual input mode shown in FIG. 29. The elastic parameter is a numerical parameter that relates actuation of the Z-axis actuator 660 to a time-varying applied force at the first load cell 616 resulting from that actuation (measured as digital force signals). It is preferable that the time-varying applied force closely approximate the desired force trajectory 910 (the deviation of the digital force signals from the desired force trajectory be kept small). Preferably, the elastic parameter is updated by the controller in real-time.

At sub-step 852, the controller controls an actuation of the Z-axis actuator in accordance with the calculated actuation (from sub-step 850). In the case that the Z-axis actuator is a stepper motor, the controller controls the stepper motor in accordance with its calculation of the number of steps of the stepper motor in the stepper motor's next iteration (cycle). The rotation of the stepper motor causes vertical movement of the load cells (first load cell 616 and second load cell 618). At sub-step 854, the first load cell 616 imparts a time-varying applied force to the sample (which includes force-measuring device 630) during its vertical movement. The time-varying applied force is imparted via at least one elastic member (620 and/or 664) positioned between the first load cell 616 and the sample.

At sub-step 856, the load cell signal processing circuitry 610 measures first force signals at the first load cell 616 and amplifies the first force signals (first amplified force signals). Optionally, the load cell signal processing circuitry 610 measures second force signals at the second load cell 618 and amplifies the second force signals (second amplified force signals). Preferably, the load cell signal processing circuitry 610 includes instrumentation amplifiers which amplify the first force signals measured at the first load cell 616 and amplify the second force signals measured at the second load cell 618. At sub-step 858, the load cell signal processing circuitry 610 outputs first amplified force signals to the controller 606. Optionally, the load cell signal processing circuitry 610 outputs second amplified force signals to the controller 606.

At sub-step 860, the controller 606 calculates digital force signals in accordance with the first amplified force signals. For example, the controller 606 includes ADCs that convert the first amplified force signals into first digital force signals. In the case that the signal processing circuitry 610 does not output second amplified force signals to the controller 606, the first digital force signals can be referred to simply as digital force signals. For example, the signal processing circuitry 610 additionally outputs second amplified force signals to the controller 606, the controller 606 also converts the second amplified force signals to second digital force signals, and the controller 606 subtracts the second digital force signals from the first digital force signals to obtain the digital force signals. In this case, the controller is configured to convert the first amplified force signals to first digital force signals; convert the second amplified force signals to second digital force signals; and subtract the second digital force signals from the first digital force signals to obtain the digital force signals. Accordingly, some of the inertial forces arising from the acceleration or deceleration of the first load cell can be cancelled.

FIG. 32 shows an example of digital force signals 912 (data points shown as squares). In the case of the digital force signals 912, 1 box along the vertical axis 904 corresponds to 5 N (same scale as the desired force trajectory

910). A digital force signal range 922 of the digital force signals 912 is the difference between the maximum and the minimum digital force signals. In the example shown, the digital force signal range 922 is approximately 7.5 N. In the example shown, the deviation of digital force signals 912 from the desired force trajectory 910 is quite small (the digital force signals 912 closely track the desired force trajectory). It is preferable that the controller be capable of updating the elastic parameter. It is preferable that the controller be configured to update the elastic parameter in accordance with a deviation of the digital force signals from the desired force trajectory. When the deviation of digital force signals 912 from the desired force trajectory 910 is relatively small, the controller can make a relatively small adjustment to the elastic parameter. When the deviation of digital force signals 912 from the desired force trajectory 910 is relatively large, the controller can make a relatively large adjustment to the elastic parameter. Accordingly, at sub-step 862, the controller updates the elastic parameter in accordance with a deviation of the digital force signals from the desired force trajectory. Sub-steps 850, 852, 854, 856, 858, 860, and optionally 862 are repeated until the desired force trajectory has been completed (decision sub-step 864). Each data point of the digital force signals 912 corresponds to one iteration of the sequence of sub-steps 850, 852, 854, 856, 858, 860, and optionally 862.

At step 810, the force-measuring device controller 638 reads the digital transducer data output from the signal processing circuitry of the force-measuring device 630 when the time-varying applied force is imparted to the sample. FIG. 32 shows an example of digital transducer data 914 (data points shown as triangles). Each data point of the digital transducer data 914 corresponds to one reading of the digital transducer data output by the force-measuring device controller 638. The force-measuring device controller 638 reads the digital transducer data multiple times for each sinusoidal wave period of the desired force trajectory 910. In the case of the digital transducer data 914, 1 box along the vertical axis 904 corresponds to 500 LSB. A digital transducer data range 924 of the digital transducer data 914 is the difference between the maximum and the minimum digital transducer data. In the example shown, the digital transducer data range 924 is approximately 1300 LSB, which can also be expressed as ±650 LSB.

At step 812, the force-measuring device controller 638 adjusts or selects a gain of the force-measuring device 830 in accordance with the digital transducer data. In the example shown, the digital force signals have a range of approximately 7.5 N, closely tracking a range of 7.5 N of the desired force trajectory. As the applied force varies with time, an increase in the force to the maximum (+7.5 N relative to the minimum) may represent a digit pressing against the force-measuring device and a decrease in the force to the minimum may represent the digit being lifted away from the force-measuring device. In the example shown, an output range of the signal processing circuitry of the force-measuring device is 2048 LSB, and a range of the desired force trajectory is 7.5 N. Depending upon a desired range of the digital transducer data, the force-measuring device controller adjusts or selects a gain of the amplifier 634. Suppose for example that the desired range of the digital transducer data is ±650 LSB, under a standard time-varying applied force of 7.5 N. The time-varying applied force is repetitively applied while an adjustable or selectable gain of the amplifier 634 is set at G1, G2, and G3. At gain G1, the range of the digital transducer data is measured to be ±610 LSB, at gain G2, the range of the digital transducer data is measured to be ±640 LSB, and at gain G3, the range of the digital transducer data is measured to be ±700 LSB. The force-measuring device controller may set the adjustable or selectable gain at G2 if a measured range of ±640 LSB is satisfactory (i.e., sufficiently close to ±650 LSB). If the measured range of ±640 LSB is not satisfactory, the force-measuring device may calculate another gain intermediate between G2 and G3 that is expected to be satisfactory and set the adjustable or selectable gain at that intermediate gain value.

Step 814 is an optional step, at which the force-measuring device controller calculates and stores calibration data in the force-measuring device. This calibration data may include: (1) a ratio A of a characteristic amplitude of the digital transducer data to a characteristic amplitude of the digital force signals; and/or (2) a ratio B of a characteristic amplitude of the digital force signals to a characteristic amplitude of the digital transducer data. A characteristic amplitude of the digital transducer data may be a range of the digital transducer data. A characteristic amplitude of the digital force signals may be a range of the digital force signals. For example, if a range of the digital force signals is 7.5 N and a range of the digital transducer data is 1280 LSB (±640 LSB), then the ratio A=1280 LSB/7.5 N and the ratio B=7.5 N/1280 LSB. These ratios A and B permit a conversion of digital transducer data (expressed in LSB) to a physical force value (expressed in Newtons) and vice versa.

Accordingly, the force-measuring device controller 638 is configured to: (1) read digital transducer data output from the signal processing circuitry of the force-measuring device(s) 630 when the time-varying applied force is imparted to the sample; and (2) adjust or select a gain of the force-measuring device(s) 630 in accordance with the digital transducer data. Optionally, the force-measuring device controller is configured to calculate calibration data and store the calibration data in the force-measuring device. The calibration data can include: (1) a ratio of a characteristic amplitude of the digital transducer data to a characteristic amplitude of the digital force signals; and/or (2) a ratio of a characteristic amplitude of the digital force signals to a characteristic amplitude of the digital transducer data.

In the force-imparting mode, the controller is configured to repeatedly carry out the following until a desired force trajectory has been executed: (1) calculate digital force signals in accordance with the amplified force signals; (2) calculate a next actuation of the Z-axis actuator in accordance with the desired force trajectory and an elastic parameter; and (3) control the actuation of the Z-axis actuator in accordance with its next calculated actuation. The elastic parameter relates actuation of the Z-axis actuator to digital force signals resulting from the actuation. Preferably, the controller is configured to update the elastic parameter in accordance with a deviation of the digital force signals from the desired force trajectory.

The first load cell 616 is configured, in the force-imparting mode, to impart a time-varying applied force, during the vertical movement of the first load cell 616, to the sample including the force-measuring device 630. The time-varying applied force is imparted via at least one elastic member positioned between the first load cell 616 and the sample.

The load cell signal processing circuitry 610 is configured to measure first force signals at the first load cell 616 and output first amplified force signals to the controller 606. Optionally, the load cell signal processing circuitry 610 is configured to measure second force signals at the second load cell 618 and output second amplified force signals to the controller 606.

Figure 21:
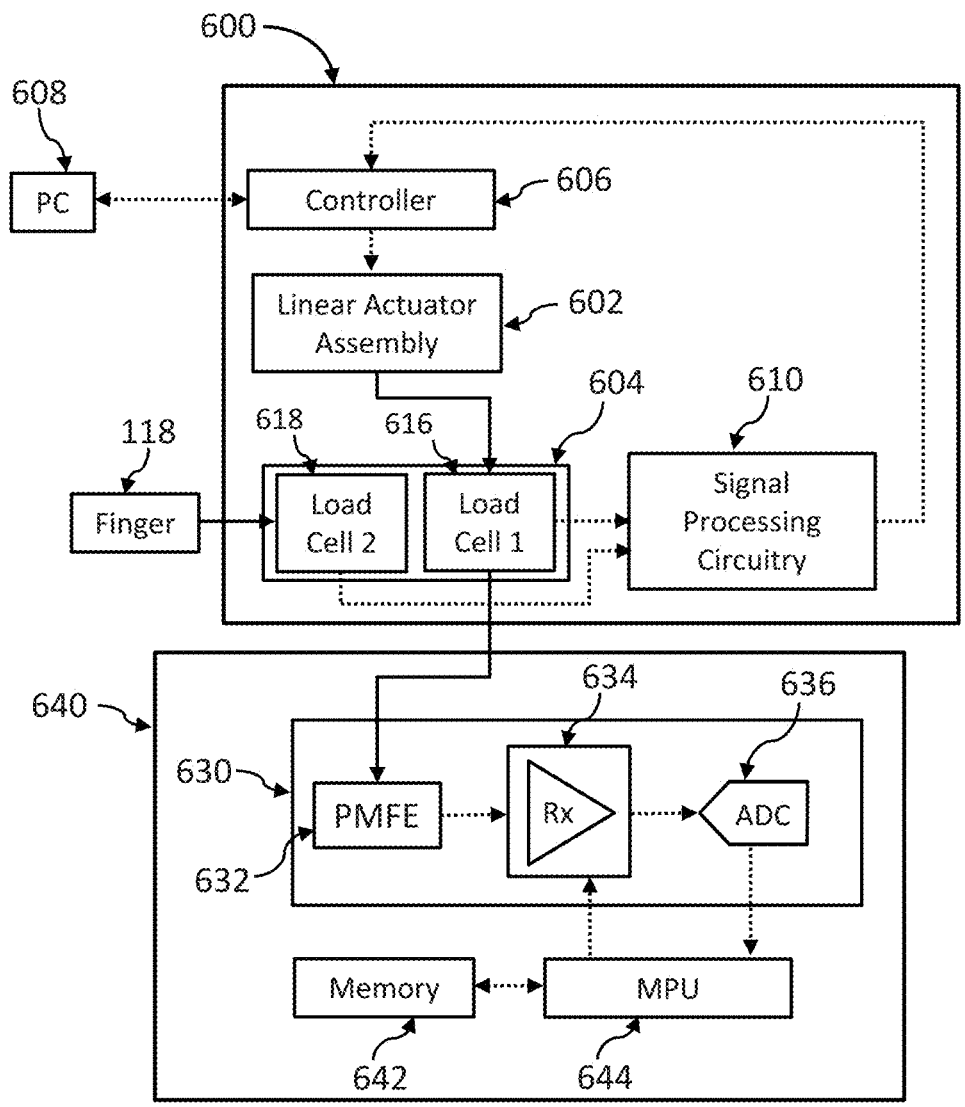
FIG. 21 is a schematic block diagram showing an arrangement of a force-measuring device testing system and an electronic apparatus incorporating a force-measuring device.

In the arrangement shown in FIG. 20, the force-measuring device controller 638 supplies power to the force-measuring device 630 and adjusts or selects a gain of the force-measuring device. As shown in FIG. 26, the force-measuring device 630 can already be incorporated into an electronic apparatus 640. In such case, an arrangement shown in FIG. 21 may be possible. FIG. 21 shows a testing system 600 identical to that shown in FIG. 20. In FIG. 21, the sample retained by the sample stage is an electronic apparatus 640 which includes the force-measuring device 630. The electronic apparatus 640 includes a microprocessor 644 and a memory 642 electronically coupled to the microprocessor 644. The microprocessor functions as the force-measuring device controller. A software program stored in the memory 642 is executed by the microprocessor 644 for the microprocessor 644 to function as a force-measuring device controller. In the arrangement shown in FIG. 21, a force-measuring device testing system 600 in combination with an electronic apparatus 640 that includes a force-measuring device 630 and a microprocessor 644 that functions as a force-measuring device controller can carry out the force-measuring device calibration method 800 (FIG. 28).

Figure 22:
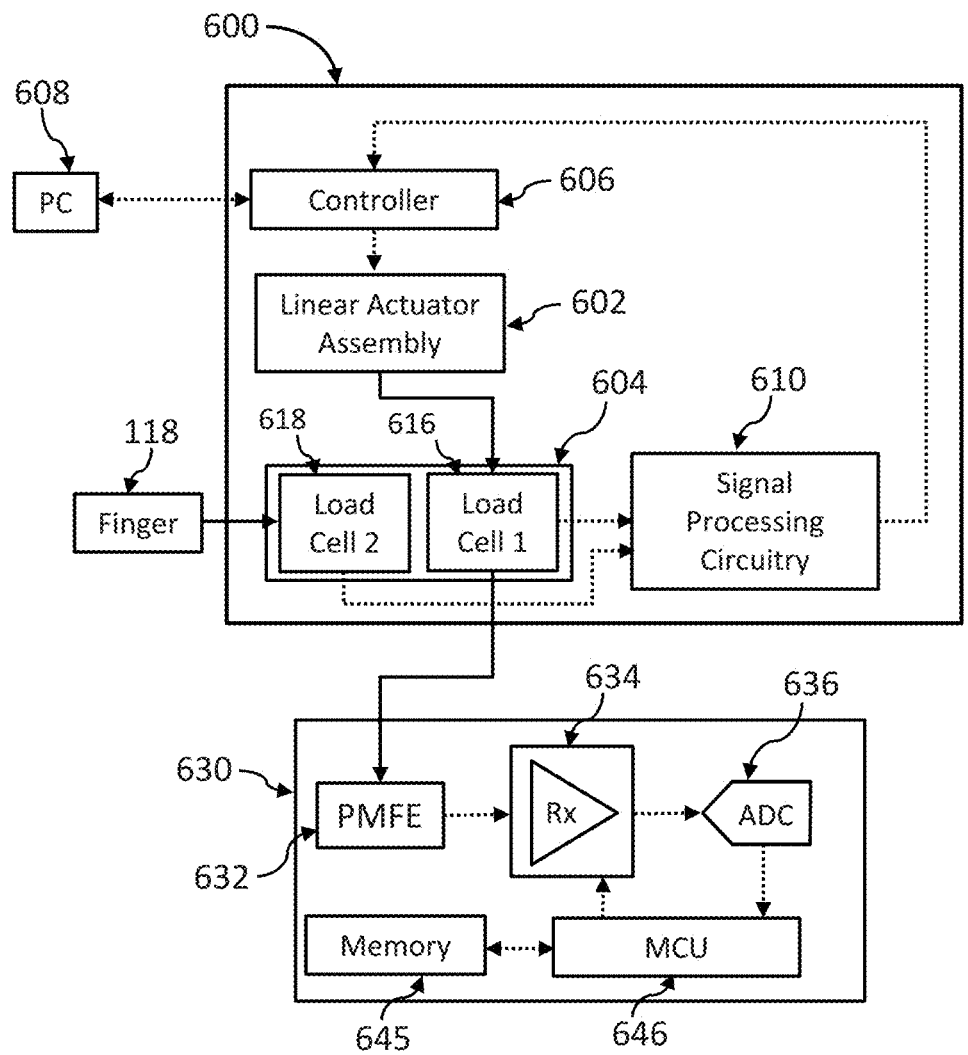
FIG. 22 is a schematic block diagram showing an arrangement of a force-measuring device testing system and a force-measuring device.

FIG. 22 shows another arrangement of a force-measuring device testing system 600 and a force-measuring device 630. FIG. 22 shows a testing system 600 identical to that shown in FIG. 20. The force-measuring device 630 additionally includes a microcontroller 646 and a memory 645 electronically coupled to the microcontroller 646. The microprocessor functions as the force-measuring device controller. A software program stored in the memory 645 is executed by the microcontroller 646 for the microcontroller to function as a force-measuring device controller. In the arrangement shown in FIG. 22, the force-measuring device requires an external apparatus (not shown) that supplies electrical power and establishes communication with it in order to operate.

Figure 16:
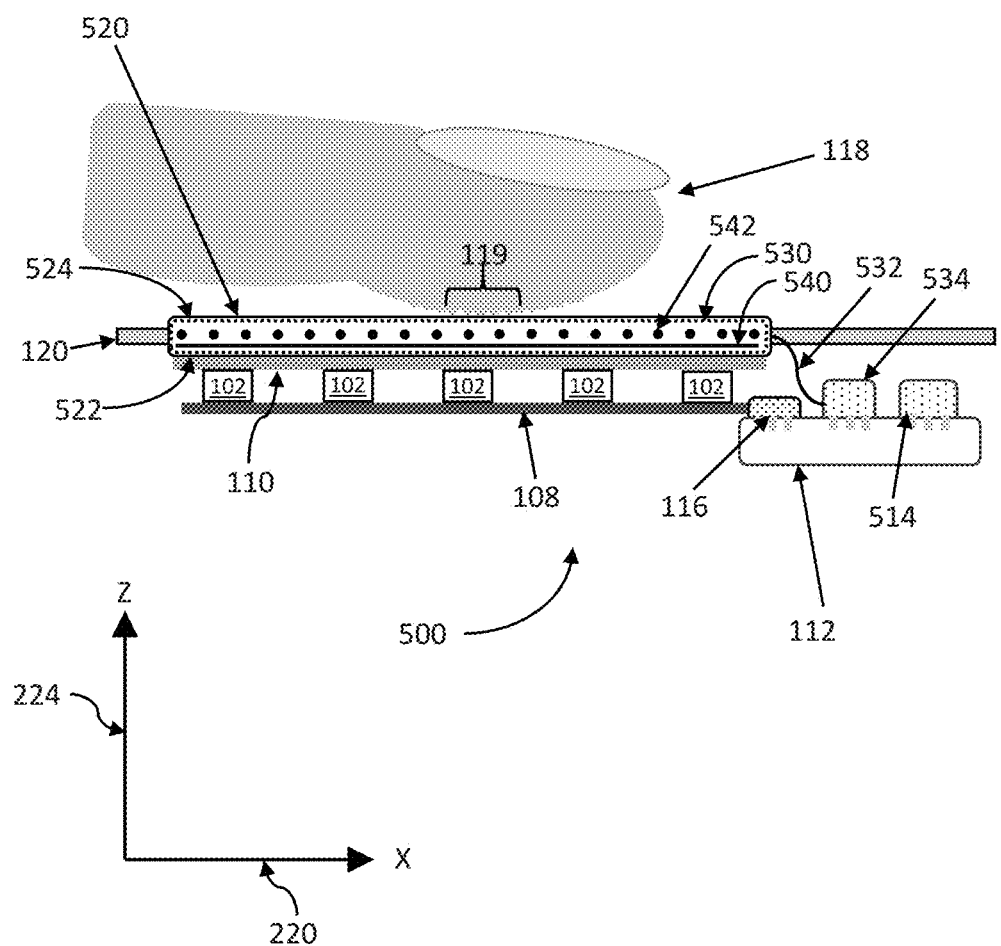
FIG. 16 is a schematic view of another illustrative user-input system having force-measuring and touch-sensing capabilities.
Figure 27:
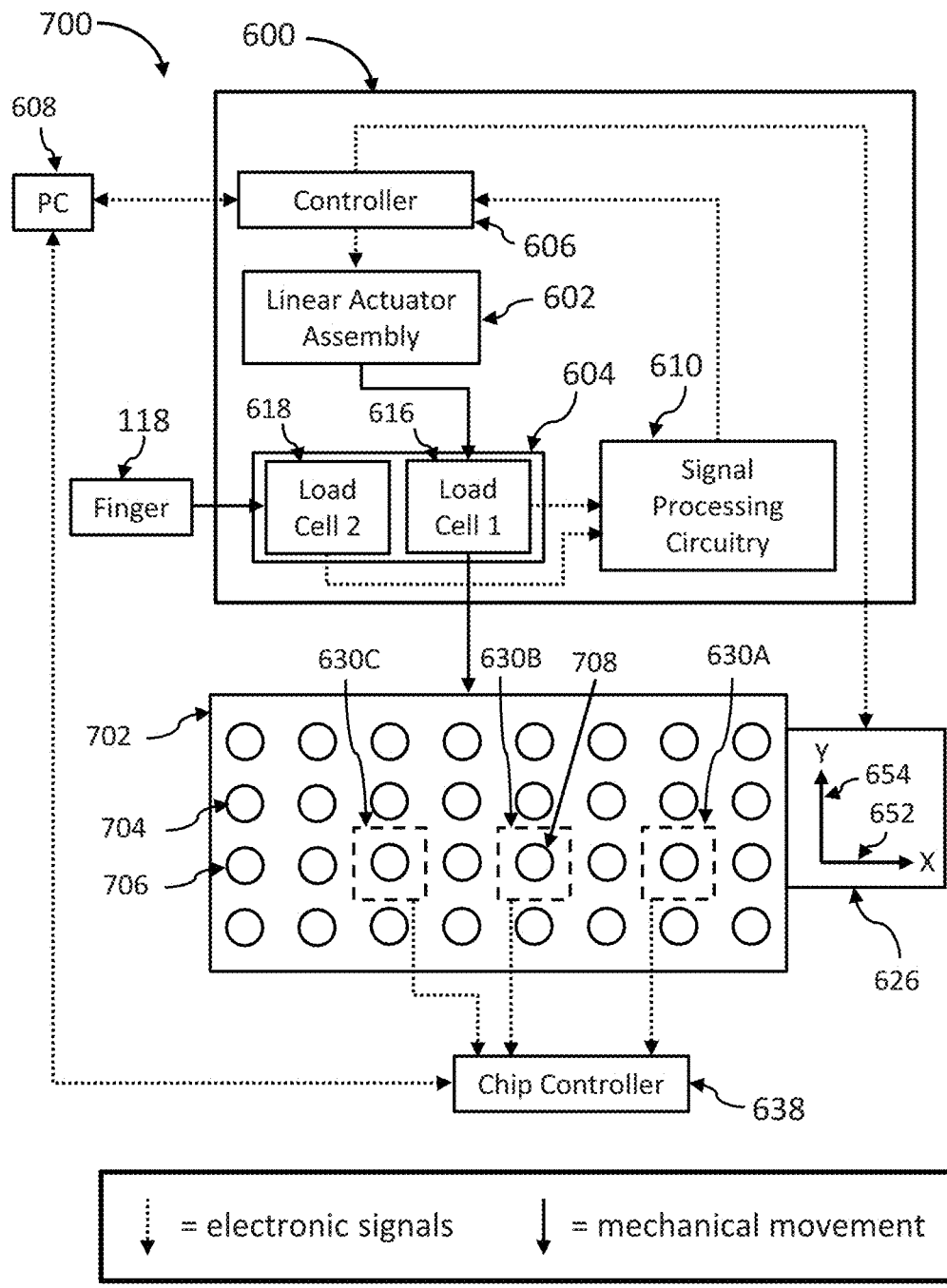
FIG. 27 is a schematic block diagram showing a mapping system for mapping data of force transmission from a plurality of force-imparting points to each force-measuring device.

FIG. 27 is a schematic block diagram of a system 700 for mapping data of force transmission from a plurality of force-imparting points to each force-measuring device. Mapping system 700 includes a testing system 600, a computer 608, and a force-measuring device controller 638. FIG. 27 shows a testing system 600 identical to that shown in FIG. 20. The computer 608 is electronically coupled to the controller 606 (of the testing system 600) and the force-measuring device controller 638. Testing system includes a sample stage 626 which retains a sample 702. For example, the sample 702 can be an electronic apparatus that incorporates at least one force-measuring device, such as a smartphone or a touch-panel user-input system 500 (FIG. 16). Sample stage 626 includes a sample stage positioner (e.g., X-axis positioner and Y-axis positioner) which positions the sample at specific positions along the X-axis 652 and Y-axis 654. The sample stage positioner positions the sample 702 at specific positions relative to the first load cell 616, such that in the force-imparting mode, the first load cell 616 imparts a force to the sample 702 at one of multiple force-imparting points 704 (shown as circles). In FIG. 27, a cover layer of the sample 702 is visible. This could be an external housing of an electronic apparatus, for example. In the force-imparting mode, the first load cell 616 imparts a time-varying applied force to the sample 702. The time-varying applied force is imparted via at least on elastic member positioned between the first load cell 616 and the sample 702. In the example shown, the sample 702 includes three force-measuring devices 630A, 630B, 630C positioned behind and attached to the cover layer. Some of the force-imparting points 706 do not overlap any of the force-measuring devices (are laterally displaced from the force-measuring devices) and some of the force-imparting points 708 overlap a respective one of the force-measuring devices. Each of the force-measuring devices (630A, 630B, 630C) includes a signal processing circuitry and the force-measuring device controller is electronically coupled to the signal processing circuitry of each force-measuring device.

Figure 31:
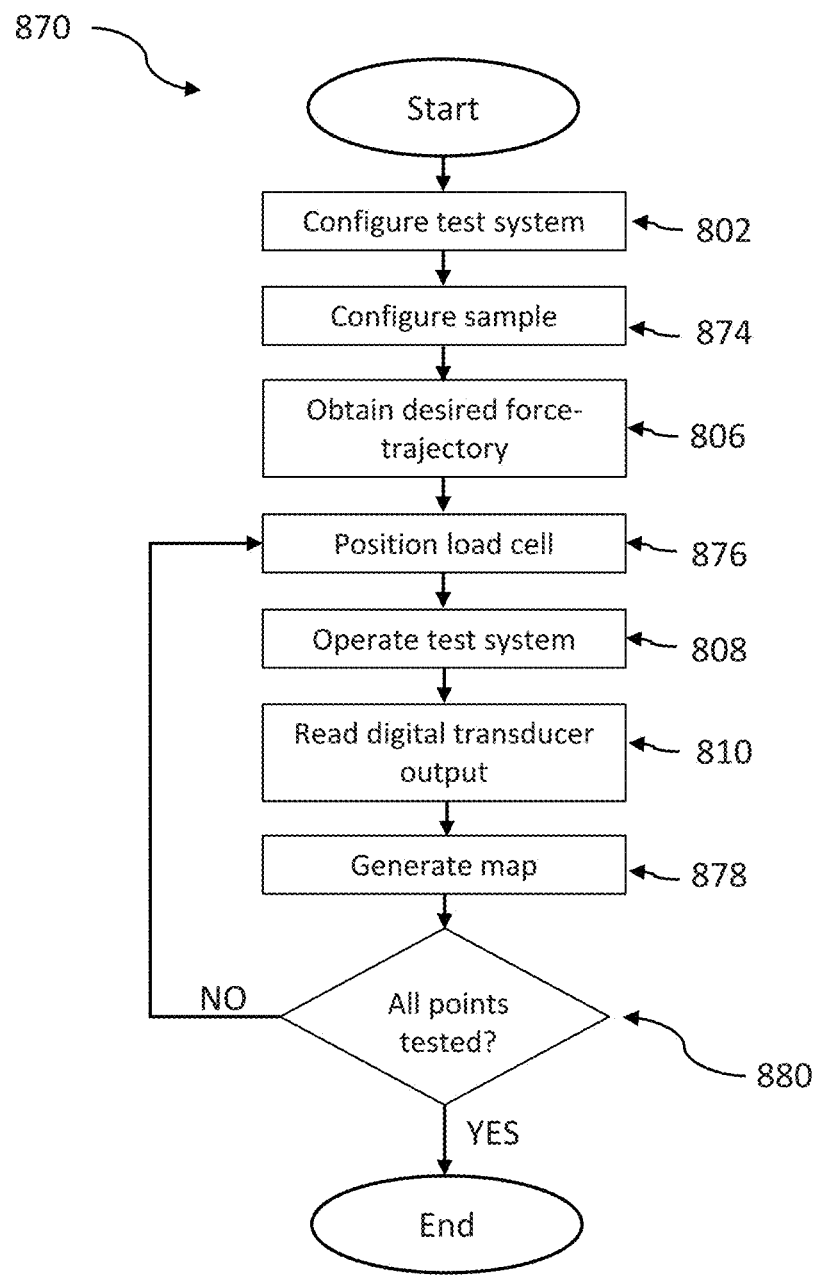
FIG. 31 is a flow diagram of a method of mapping data of force transmission from a plurality of force-imparting points to each force-measurement device.

FIG. 31 is a flow diagram of a method 870 of mapping data of force transmission from a plurality of force-imparting points to each force-measurement device. System 700 shown in FIG. 27 is used. Method 870 includes steps 802, 874, 806, 876, 808, 810, 878, and 880. At step 802, the force-measuring device testing system (testing system) 600 is configured. Step 802 has been described with reference to FIG. 28.

At step 874, a sample stage, a sample including a force-measuring device, and a force-measuring device controller are configured. The sample stage 626 includes a sample stage positioner (e.g., X-axis positioner and Y-axis positioner) which positions the sample at specific positions along the X-axis 652 and Y-axis 654. The sample stage positioner positions the sample 702 at specific positions relative to the first load cell 616, such that in the force-imparting mode, the first load cell 616 imparts a force to the sample 702 at one of multiple force-imparting points 704. The sample stage (626 of FIG. 27) retains the sample 702 which includes at least one force-measuring device (630A, 630B, 630C). Each force-measuring device 630A, 630B, 630C includes a signal processing circuitry. The force-measuring device controller 638 is electronically coupled to the signal processing circuitry of each force-measuring device 630.

At step 806, a desired force-trajectory is obtained. Step 806 has been described with reference to FIGS. 28 and 29. As discussed, FIG. 29 is a flow diagram of an example method of obtaining the desired force-trajectory by manual force input, such as a force input by a finger at the second load cell. After the desired force trajectory has been measured (for example, according to FIG. 29) and stored, step 806 can include retrieving a previously recorded desired force trajectory. Furthermore, the desired force trajectory can be constructed digitally or can be measured at another force sensor different from the second load cell 618.

At step 876, the controller controls actuation of the sample stage positioner to position the first load cell 616 at each one of a plurality of force-imparting points 704 on the sample 702. For each respective force-imparting point, steps 808, 810, 878, and 880 are carried out. Steps 808, 810, and 878 are carried out repeatedly until all of the force-imparting points 704 have been tested (decision step 880). At step 808, the testing system 600 is operated. Step 808 has been described with reference to FIGS. 28 and 30. At step 810, the force-measuring device controller 638 reads the digital transducer data output from the signal processing circuitry of the force-measuring device 630 when the time-varying applied force is imparted to the sample at each force-imparting point 704. Step 810 has been described with reference to FIG. 28. At step 878, a map of data of force transmission from the plurality of force-imparting points 704 to the force-measuring device (630A, 630B, and/or 630C) is generated in accordance with digital transducer data obtained from of the force-measuring device (630A, 630B, and/or 630C) upon the imparting of the time-varying applied force at each respective force-imparting point 704. When a force is imparted to a sample at a force-imparting point, there is a low-frequency mechanical deformation propagating in the sample which causes a respective strain at the PMFEs of the force-measuring devices and digital transducer data are obtained from the force-measuring devices in accordance with the respective strain.

Figure 33:
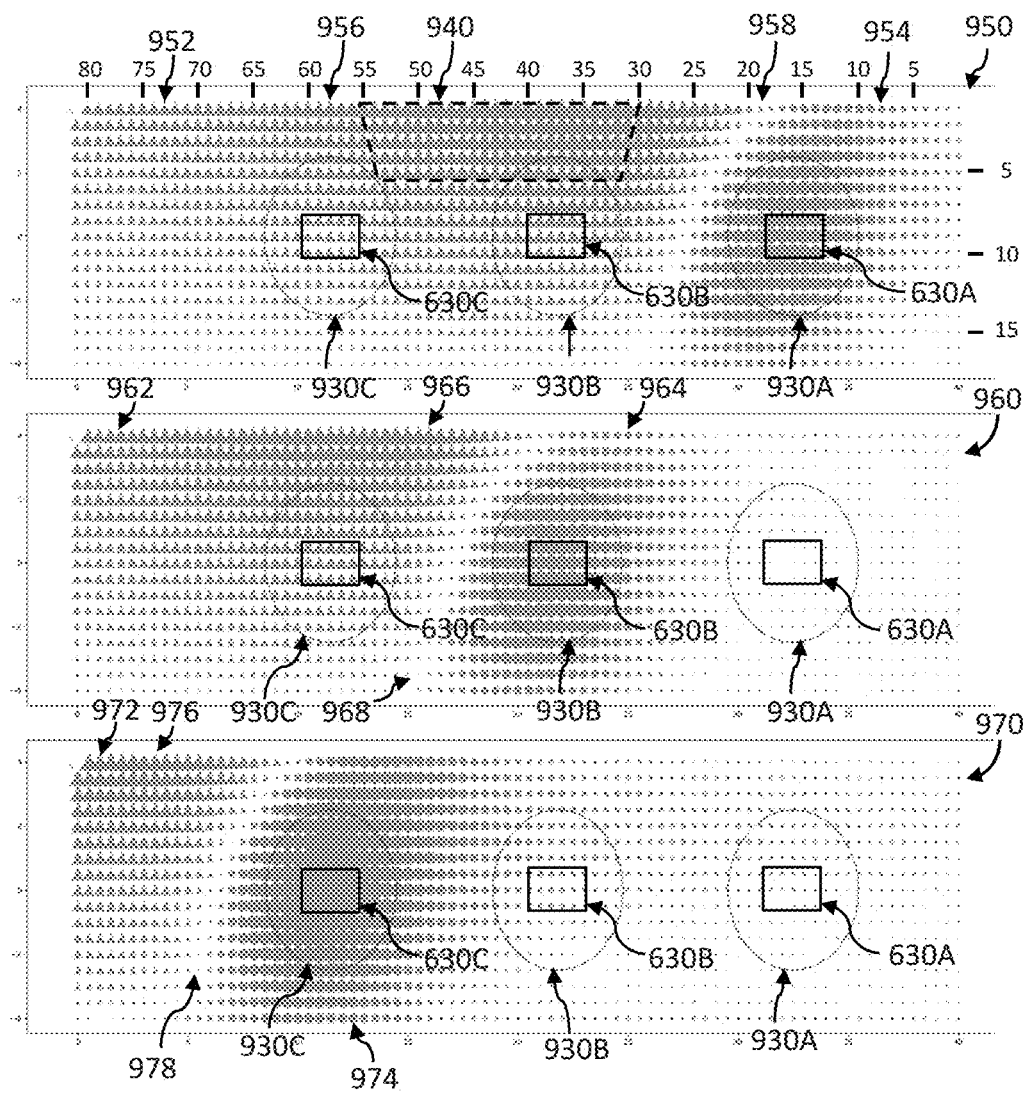
FIG. 33 shows plots of data of force transmission from force-imparting points to each of the force-measuring devices.

FIG. 33 shows three two-dimensional plots 950, 960, and 970. Each plot (950, 960, 970) is a map of data of force transmission from a plurality of force-imparting points (952, 962, 972) to a respective force-measuring device (630A, 630B, 630C). The locations of the force-measuring devices are marked by rectangles that represent the approximate lateral dimensions of each force-measuring device. The force-measuring devices are attached, via an adhesive to a cover layer, which is a plastic frame in this example. The plastic frame is mounted to the sample stage 626. There are approximately 17 rows and 81 columns of force-imparting points in each plot. All of the force-imparting points are on the plastic frame. The force-imparting points extend over an area measuring approximately 40 mm (along X-axis 982) by 8 mm (along Y-axis 984). There is a data point at the location of each force-imparting point. Each data point is either a circle or a triangle. A circle represents a first polarity of the digital transducer data and a triangle represents a second polarity of transducer data opposite the first polarity. The size of the circle or triangle represents a characteristic amplitude of the digital transducer data. For example, plot 950 is a map of data of force transmission from force-imparting points 952 to the force-measuring device 630A (locations of other force-measuring devices 630B and 630C are shown for illustration only). A shape (circle or triangle) at each force-imparting point 952 represents (1) a polarity of the digital transducer data obtained from force-measuring device 630A and (2) a characteristic amplitude of the digital transducer data obtained from force-measuring device 630 upon the imparting of the time-varying applied force at the respective force-imparting point 952.

Figure 34:
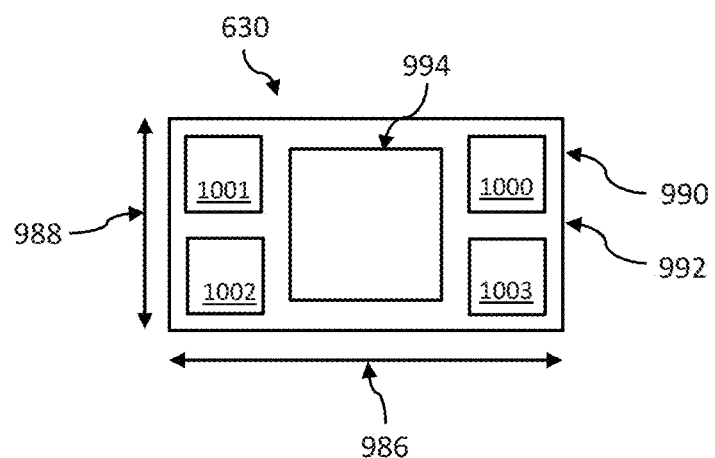
FIG. 34 is a schematic top view of a MEMS portion of a force-measuring device used in the mapping of FIG. 33.

FIG. 34 is a schematic top view of a specific implementation of a force-measuring device 630, used as force-measuring devices 630A, 630B, and 630C in the mapping shown in FIG. 33. In this example, the force-measuring device is implemented as a packaged integrated circuit (IC) with lateral dimensions of approximately 2.6 mm along its long direction 986 and approximately 1.4 mm along its short direction 988. There are four piezoelectric micromechanical force-measuring elements (PMFEs) (1000, 1001, 1002, 1003) near the four corners and an array 994 of piezoelectric micromechanical ultrasonic transducers (PMUTs). These PMUTs are configured to have a touch-sensing functionality. Accordingly, this force-measuring device can be referred to as a force-measuring and touch-sensing IC (FMT SIC). In the mapping shown in FIG. 33, the digital transducer data obtained from the force-measuring device is a sum of the data at the four PMFEs (1000, 1001, 1002, 1003).

Figure 35:
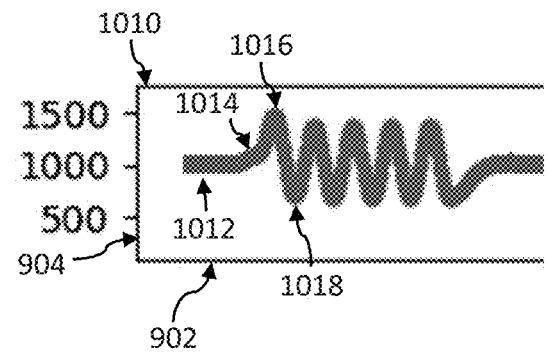
FIGS. 35, 36, and 37 are graphical plots of digital transducer data measured at one of the force-measuring devices in response to forces imparted at respective force-imparting points.

Plot 950 is a map of data of force transmission from force-imparting points 952 to the right force-measuring device 630A. For some force-imparting points 954 near the force-measuring device 630A, the data points are circles (first polarity) and for some force-imparting points 956 remote from the force-measuring device 630A the data points are triangles (second polarity). FIG. 35 is graphical plot 1010 of digital transducer data measured at the force-measuring device 630A in response to a time-varying applied force imparted at one of the near force-imparting points 954, specifically force-imparting point located at row 9, column 16. The rows (every 5 rows) are labeled to the right of plot 950 and the columns (every 5 columns) are labeled at the top of plot 950. This force-imparting point overlaps force-measuring device 630A. The time-varying applied force consists of repetitively pressing, by the first load cell, against the force-imparting point five times. Plot 1010 has a horizontal axis 902 which shows time t and a vertical axis 904 which shows force (digital transducer data). Before the application of the time-varying applied force, the PMFEs are in a quiescent state (plot section 1012). As the time-varying applied force begins, the digital transducer data show a positive slope (plot section 1014) and then reaches a maximum 1016, corresponding to strain of a first polarity at the PMFEs. This corresponds to the PMFEs under tension (see PMFE 146 in FIG. 5). As the pressure at the force-imparting point is released, the digital transducer data decreases from a maximum 1016 to a minimum 1018. Local maxima are reached five times, corresponding repetitively pressing against the force-imparting point five times. A characteristic amplitude of the digital transducer data can be defined to be a difference between a local maximum 1016 and a local minimum 1018. Alternatively, a characteristic amplitude of the digital transducer data can be defined to be a difference between a global maximum and a global minimum, within a predetermined time window such as shown in FIG. 35.

Figure 36:
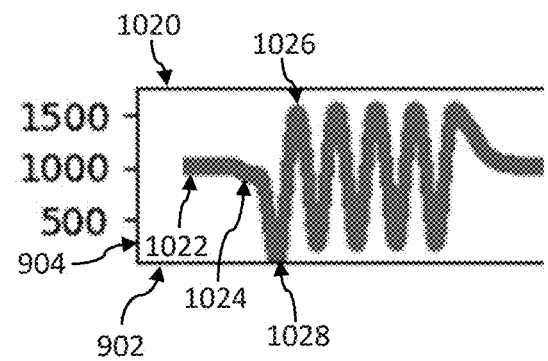

FIG. 36 is graphical plot 1020 of digital transducer data measured at the right force-measuring device 630A in response to a time-varying applied force imparted at one of the remote force-imparting points 956, specifically force-imparting point located at row 1, column 38. This force-imparting point corresponds to one of the large triangles above middle force-measuring device 630B. The time-varying applied force consists of repetitively pressing, by the first load cell, against the force-imparting point five times. Plot 1020 has a horizontal axis 902 which shows time t and a vertical axis 904 which shows force (digital transducer data). Before the application of the time-varying applied force, the PMFEs are in a quiescent state (plot section 1022). As the time-varying applied force begins, the digital transducer data show a negative slope (plot section 1024) and then reaches a local minimum 1028, corresponding to strain of a second polarity at the PMFEs. This corresponds to the PMFEs under compression (see PMFE 146A in FIG. 5). As the pressure at the force-imparting point is released, the digital transducer data increases from a local minimum 1028 to a local maximum 1026. Local minima are reached five times, corresponding repetitively pressing against the force-imparting point five times. A characteristic amplitude of the digital transducer data can be defined to be a difference between the local maximum 1026 and the local minimum 1028. Alternatively, a characteristic amplitude of the digital transducer data can be defined to be a difference between a global maximum and a global minimum, within a predetermined time window such as shown in FIG. 36.

Figure 37:
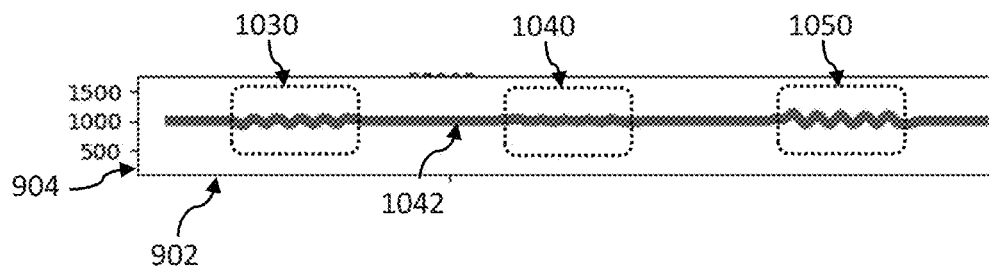

In plot 950, there is a narrow region (band) of force-imparting points 958, located between the near force-imparting points 954 and remote force-imparting points 956, for which the characteristic amplitudes are quite small. In this band of force-imparting points, there is a transition between force-imparting points of a first polarity and of a second polarity. FIG. 37 is used to explain this transition. FIG. 37 shows graphical plots of digital transducer data measured at the right force-measuring device 630A in response to a time-varying applied force imparted at the following force-imparting points: plot 1030 corresponds to a force-imparting point at row 5, column 24, plot 1040 corresponds to a force-imparting point at row 5, column 23, and plot 1050 corresponds to a force-imparting point at row 5, column 22. Plots 1030, 1040, and 1050 have characteristic amplitudes that are quite small compared to plots 1010 (FIG. 35) and 1020 (FIG. 36). Plot 1030, corresponding to a force-imparting point farthest from force-measuring device 630A, shows a second polarity (triangles), and plot 1050, corresponding to a force-imparting point closest to force-measuring device 630A, shows a first polarity (circles). Amplitudes in plot 1040 are small enough that it is difficult to discern the polarity. There is a transition between the polarities at or near the force-imparting point corresponding to plot 1040.

Plot 960 is a map of data of force transmission from force-imparting points 962 to the middle force-measuring device 630B. For some force-imparting points 964 near the force-measuring device 630B, the data points are circles (first polarity) and for some force-imparting points 956 remote from (and generally to the left of) the force-measuring device 630B the data points are triangles (second polarity). There is a narrow region (band) of force-imparting points 968, located between the near force-imparting points 964 and remote force-imparting points 966, for which the characteristic amplitudes are quite small. In this band of force-imparting points, there is a transition between force-imparting points of a first polarity and of a second polarity.

Plot 970 is a map of data of force transmission from force-imparting points 972 to the left force-measuring device 630C. For some force-imparting points 974 near the force-measuring device 630C, the data points are circles (first polarity) and for some force-imparting points 976 remote from (and generally to the left of) the force-measuring device 630C the data points are triangles (second polarity). There is a narrow region (band) of force-imparting points 978, located between the near force-imparting points 974 and remote force-imparting points 976, for which the characteristic amplitudes are quite small. In this band of force-imparting points, there is a transition between force-imparting points of a first polarity and of a second polarity.

In plot 950, there is a region of remote force-imparting points (approximately bounded by boundary 940) from which there is significant force-transmission to the force-measuring device 630A. This significant force-transmission may be attributed to mechanical characteristics of the cover layer (e.g., housing) to which the force-measuring devices 630A, 630B, 630C are attached to which a time-varying force is imparted. For example, such mechanical characteristics can include (1) shape, thickness, and/or rigidity of the cover layer or (2) another element to which the cover layer is mechanically coupled. In this region 940, the characteristic amplitudes of the digital transducer data are comparable in magnitude to those measured from nearby force-imparting points that overlap force-measuring device 630A. The polarity of the digital transducer data for force-imparting points in region 940 (second polarity, shown as triangles) is opposite to the polarity of the digital transducer data for force-imparting points that overlap force-measuring device 630A (first polarity, shown as circles).

Suppose that we wish to construct a multi-virtual button user-input system in which each force-measuring device corresponds to a respective virtual button. If the user-input system relies solely on the characteristic amplitudes of the digital transducer data, forces imparted in region 940 can cause false-triggers. In this case, it might not be possible to distinguish user-inputs at force-measuring device 630A from false-triggers in region 940. Based on the mapping results shown in plot 950, some of the aforementioned mechanical characteristics can be modified to modify force-transmission from region 940 to force-measuring device 630A. Additionally, or alternatively, the user-input system can be configured to distinguish user-inputs based on the characteristic amplitude and polarity of the digital transducer data.

Plot 950 shows an oval region 930A surrounding the force-measuring device 630A. This oval region 930A approximately indicates a sensitivity region in which a user-input intended for force-measuring device 630A can be distinguished from a false-trigger input, when the false-trigger input arises from an applied force imparted at a force-imparting point remote from the force-measuring device 630A. For example, digital transducer data for force-imparting points in sensitivity region 930A have a first polarity and a characteristic amplitudes that are quite large (e.g., exceeding a predetermined threshold). Plot 950 also shows sensitivity regions 930B and 930C surrounding force-measuring devices 630B and 630C respectively. Forces imparted in sensitivity regions 930B and 930C are of an opposite polarity (second polarity) and hence can be distinguished as false-triggers different from user-input in sensitivity region 930A.

An area of sensitivity region 930A is several times larger than the area of the force-measuring device 630A. Specifically, the force-measuring device 630A has lateral dimensions of 2.6 mm (along X-axis 982) by 1.4 mm (along Y-axis 984). Accordingly, the force-measuring device 630A covers an area of 3.64 mm$^2$. Oval region 930A has approximate dimensions of 5.9 mm (along X-axis 982) by 5.0 mm (along Y-axis 984). This area is approximately 23.2 mm$^2$, which is about 6.4 times greater than the force-measuring device area. When implementing a virtual-button using a force-measuring device, a sensitivity area that is at least three times greater, four times greater, five times greater, or six times greater than a lateral area of the force-measuring device can be achieved.

In plot 960, user-input in middle sensitivity region 930B, intended for force-measuring device 630B, can be distinguished. For example, digital transducer data for force-imparting points in sensitivity region 930B have a first polarity and a characteristic amplitude that are quite large (e.g., exceed a predetermined threshold). Digital transducer data for force-imparting points in right sensitivity region 930A have characteristic amplitudes that are quite small (e.g., less than a predetermined threshold) and digital transducer data for force-imparting points in left sensitivity region 930C have a second polarity opposite the first polarity. The digital transducer data are of the first polarity in sensitivity regions 930A and 930B.

In plot 970, user-input in left sensitivity region 930C, intended for force-measuring device 630C, can be distinguished. For example, digital transducer data for force-imparting points in sensitivity region 930C have a first polarity and a characteristic amplitudes that are quite large (e.g., exceed a predetermined threshold). Digital transducer data for force-imparting points in right sensitivity region 930A and middle sensitivity region 930B have characteristic amplitudes that are quite small (e.g., less than a predetermined threshold). The digital transducer data are of the first polarity in all three sensitivity regions 930A, 930B, and 930C.

Figure 1:
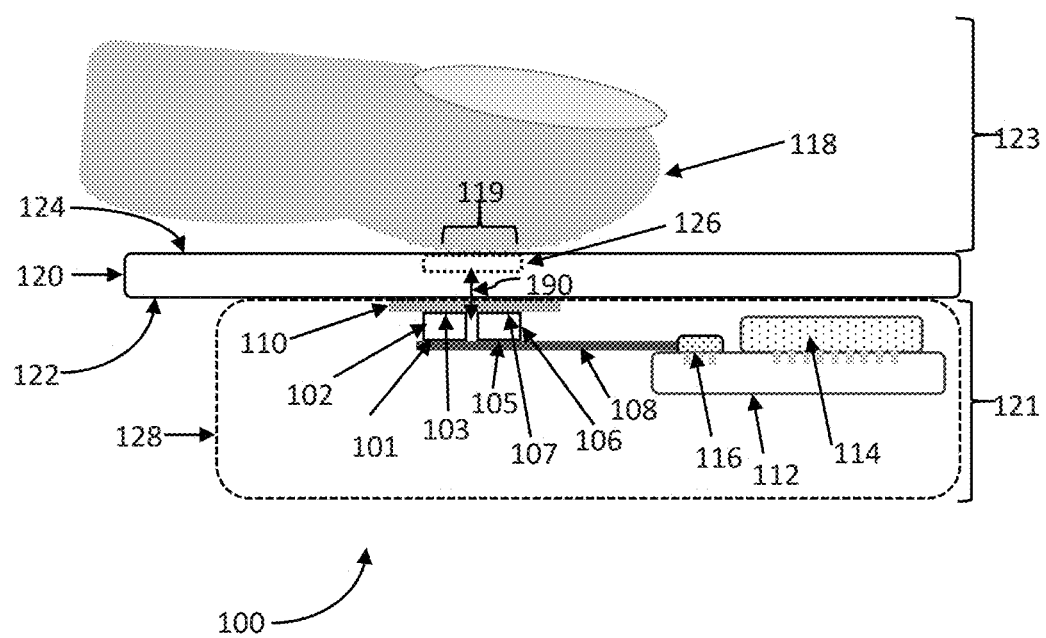
FIG. 1 is a schematic view of a user-input system including two force-measuring and touch-sensing integrated circuits (FMTSICs).

Details and possible variations of the force-measuring device (630) are discussed hereinbelow. FIG. 1 is a schematic view of an input system 100. In the example shown, the input system 100 includes force-measuring devices (102, 106) that are implemented as packaged integrated circuits (ICs) additionally including touch-sensing functionality. Such devices are sometimes referred to as force-measuring and touch-sensing integrated circuits (FMTSICs). Each of the force-measuring devices 102, 106 has an electrical interconnection surface (bottom surface) 101, 105 and an ultrasound transmission surface (top surface) 103, 107. The FMTSICs 102, 106 are mounted to a flexible circuit substrate (flexible circuit) 108 (e.g., an FPC or flexible printed circuit) on the electrical interconnection surfaces 101, 105. The flexible circuit substrate 108 is electrically and mechanically connected to a printed circuit board (PCB) 112 via a connector 116. Other ICs 114 are mounted on the PCB 112, and such other ICs 114 could be a microcontroller (MCU), microprocessor (MPU), and/or a digital signal processor (DSP), for example. These other ICs 114 could be used to run programs and algorithms to analyze and categorize touch events based on data received from the FMTSICs 102, 106. Other ICs 114 can also be mounted to the flexible circuit. Generally, signal processing circuitry can be implemented in the force-measuring devices (102, 106) and/or the ICs 114. The signal processing circuitry can be implemented in a single IC, or in multiple ICs.

Input system 100 includes a cover layer 120 having an exposed outer surface 124 and an inner surface 122. The cover layer 120 could be of any robust layer(s) that is sufficiently deformable such that a deformation of the cover layer is transmitted to the PMFEs in the FMTSICs, as described with reference to FIG. 5. In the case that the force-measuring device 102, 106 includes ultrasonic transducers, the cover layer can be a material that transmits ultrasound waves. Examples of robust materials that transmit ultrasound waves are wood, glass, metal, plastic, leather, fabric, and ceramic. The cover layer 120 could also be a composite stack of any of the foregoing materials. The force-measuring devices 102,106 are adhered to or attached to the inner surface 122 of the cover layer 120 by a layer of adhesive 110. The choice of adhesive 110 is not particularly limited as long as the force-measuring devices 102, 106 remain attached to the cover layer. The adhesive 110 could be double-sided tape, pressure sensitive adhesive (PSA), epoxy adhesive, or acrylic adhesive, for example. Force-measuring devices 102, 106 are coupled to the inner surface 122. In some embodiments, the force-measuring device includes ultrasonic transducers. Ultrasonic transducers that can be fabricated using micro-electromechanical systems (MEMS) technologies include piezoelectric micromechanical ultrasonic transducers (PMUTs) and capacitive micromechanical ultrasound transducers (CMUTs). In operation, ultrasonic transducers in the FMTSICs 102, 106 generate ultrasound waves. At least some of the generated ultrasound waves exit the FMTSICs 102, 106 through the respective ultrasound transmission surfaces (top surfaces) 103, 107, through the adhesive layer 110, then through the inner surface 122, and then through the cover layer 120. The ultrasound waves reach a sense region 126 of the exposed outer surface 124. The sense region 126 is a region of the exposed outer surface 124 that overlaps the FMTSICs 102, 106. A MEMS chip that incorporates a piezoelectric micromechanical force-measuring element (PMFE) and a piezoelectric micromechanical ultrasound transducers (PMUT) is an example of a FMTSIC, a force-measuring integrated circuit device that additionally incorporates touch-sensing functionality.

FIG. 1 illustrates a use case in which a human finger 118 is touching the cover layer at the sense region 126. If there is no object touching the sense region 126, the ultrasound waves that have propagated through the cover layer 120 are reflected at the exposed outer surface (at the air-material interface) and the remaining echo ultrasound waves travel back toward the FMTSICs 102, 106. On the other hand, if there is a finger 118 touching the sense region, there is relatively large attenuation of the ultrasound waves by absorption through the finger. As a result, it is possible to detect a touch event by measuring the relative intensity or energy of the echo ultrasound waves that reach the FMTSICs 102, 106.

It is possible to distinguish between a finger touching the sense region 126 and a water droplet landing on the sense region 126, for example. When a finger touches the sense region 126, the finger would also exert a force on the cover layer 120. The force exerted by the finger on the cover layer can be detected and measured using the PMFEs in the FMTSIC. On the other hand, when a water droplet lands on the sense region, the force exerted by the water droplet on the PMFEs would be quite small, and likely less than a noise threshold. More generally, it is possible to distinguish between a digit that touches and presses the sense region 126 and an inanimate object that comes into contact with the sense region 126. In both cases (finger touching the sense region or water droplet landing on the sense region), there would be a noticeable decrease in an amplitude of the PMUT receiver signal, indicating a touch at the sense region, but there might not be enough information from the PMUT receiver signal to distinguish between a finger and a water droplet.

FIG. 1 shows a finger-touch zone 119, which is a zone of contact between the finger 118 and the cover layer 120. Finger-touch zone 119 has a size (a lateral dimension) that depends on factors such as size of the finger 118 and whether the finger is a bare finger or a glove-covered finger. Typically, a finger-touch zone 119 can have a size in a range of 3 mm to 7 mm. In the example shown, FMTSICs 102 and 106 are separated from each other by a distance smaller than the finger-touch zone 119. Accordingly, FMTSICs 102 and 106 can correspond to a single virtual button. A touch-input system can have multiple virtual buttons, and the virtual buttons can be separated from each other by a distance greater than a finger-touch zone.

System 100 can be implemented in numerous apparatuses. For example, the FMTSICs can replace conventional buttons on Smartphones, keys on computer keyboards, sliders, or track pads. The interior contents 128 of an apparatus (e.g., FMTSICs 102, 106, flexible circuit 108, connector 116, PCB 112, other ICs 114) can be sealed off from the exterior 123 of the cover layer 120, so that liquids on the exterior 123 cannot penetrate into the interior 121 of the apparatus. The ability to seal the interior of an apparatus from the outside helps to make the apparatus, such as a Smartphone or laptop computer, waterproof. There are some applications, such as medical applications, where waterproof buttons and keyboards are strongly desired. The apparatus can be a mobile appliance (e.g., Smartphone, tablet computer, laptop computer), a household appliance (e.g., washing machine, dryer, light switches, air conditioner, refrigerator, oven, remote controller devices), a medical appliance, an industrial appliance, an office appliance, an automobile, or an airplane, for example.

Figure 2:
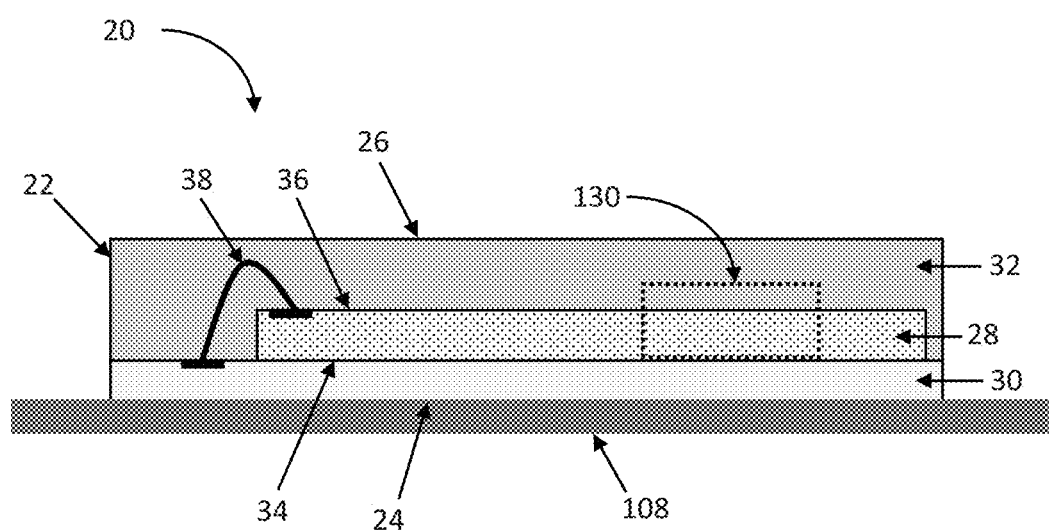
FIG. 2 is a schematic cross-sectional view of a force-measuring device, implemented as a force-measuring and touch-sensing integrated circuit (FMTSIC).

The force-measuring, touch-sensing integrated circuit (FMTSIC) is shown in greater detail in FIG. 2. FIG. 2 is a cross-sectional view the force-measuring device (more specifically, FMTSIC) 20, which is analogous to FMTSIC 102, 106 in FIG. 1. FMTSIC 20 is shown encased in a package 22, with an ultrasound transmission surface (top surface) 26 and electrical interconnection surface (bottom surface) 24. Ultrasound transmission surface 26 is analogous to surfaces 103, 107 in FIG. 1 and electrical interconnection surface 24 is analogous to surfaces 101, 105 in FIG. 1. The FMTSIC 20 includes a package substrate 30, semiconductor portion (chip) 28 mounted to the package substrate 30, and an encapsulating adhesive 32, such as an epoxy adhesive. After the semiconductor die 28 is mounted to the package substrate 30, wire bond connections 38 are formed between the die 28 and the package substrate 30. Then the entire assembly including the die 28 and the package substrate 30 are molded (encapsulated) in an epoxy adhesive 32. The epoxy side (top surface or ultrasound transmission surface 26) of the FMTSIC is adhered to (coupled to) the inner surface 122 of the cover layer 120. The FMTSIC 20 is shown mounted to the flexible circuit 108. It is preferable that the FMTSIC have lateral dimensions no greater than 10 mm by 10 mm. The wire bond connection is formed between the top surface 36 of the semiconductor die 28 and the package substrate 30. Alternatively, electrical interconnections can be formed between the bottom surface 34 of the semiconductor die 28 and the package substrate. The semiconductor die 28 consists of an application-specific integrated circuit (ASIC) portion and a micro-electro-mechanical systems (MEMS) portion. A selected portion 130 of the semiconductor die 28 is shown in cross-section in FIG. 3.

Figure 3:
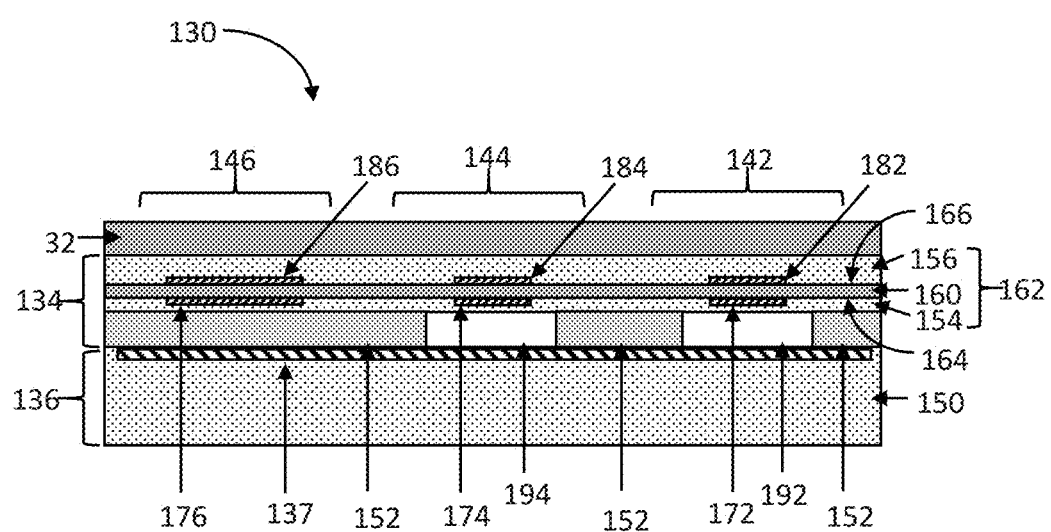
FIG. 3 is a schematic cross-sectional view of a certain portion of the force-measuring and touch-sensing integrated circuit (FMTSIC) of FIG. 2.

FIG. 3 is a schematic cross-sectional view of a portion 130 of the force-measuring and touch-sensing integrated circuit of FIG. 2. The semiconductor die 28 includes a MEMS portion 134 and an ASIC portion 136. Between the ASIC portion 136 and the MEMS portion 134, the MEMS portion 134 is closer to the ultrasound transmission surface 26 and the ASIC portion 136 is closer to the electrical interconnection surface 24. The ASIC portion 136 consists of a semiconductor substrate 150 and signal processing circuitry 137 thereon. Typically, the semiconductor substrate is a silicon substrate, but other semiconductor substrates such as silicon-on-insulator (SOI) substrates can also be used.

The MEMS portion 134 includes a PMUT transmitter 142, a PMUT receiver 144, and a PMFE 146. The MEMS portion 134 includes a thin-film piezoelectric stack 162 overlying the semiconductor substrate 150. The thin-film piezoelectric stack 162 includes a piezoelectric layer 160, which is a layer exhibiting the piezoelectric effect. Suitable materials for the piezoelectric layer 160 are aluminum nitride, scandium-doped aluminum nitride, polyvinylidene fluoride (PVDF), lead zirconate titanate (PZT), $K_xNa_{1-x}NbO_3$ (KNN), quartz, zinc oxide, and lithium niobate, for example. For example, the piezoelectric layer is a layer of aluminum nitride having a thickness of approximately 1 μm. The piezoelectric layer 160 has a top major surface 166 and a bottom major surface 164 opposite the top major surface 166. In the example shown, the thin-film piezoelectric stack 162 additionally includes a top mechanical layer 156, attached to or adjacent to (coupled to) top major surface 166, and a bottom mechanical layer 154, attached to or adjacent to (coupled to) bottom major surface 164. In the example shown, the thickness of the top mechanical layer 156 is greater than the thickness of the bottom mechanical layer 154. In other examples, the thickness of the top mechanical layer 156 can be smaller than the thickness of the bottom mechanical layer 154. Suitable materials for the mechanical layer(s) are silicon, silicon oxide, silicon nitride, and aluminum nitride, for example. Suitable materials for the mechanical layer(s) can also be a material that is included in the piezoelectric layer 160, which in this case is aluminum nitride. In the example shown, the top mechanical layer and the bottom mechanical layer contain the same material. In other examples, the top mechanical layer and the bottom mechanical layer are of different materials. In other examples, one of the top mechanical layer and the bottom mechanical layer can be omitted. The mechanical layer(s) adjust the mechanical properties of the thin-film piezoelectric stack 162. When coupled to the cover layer, the FMTSIC 20 is preferably oriented such that the piezoelectric layer 160 faces toward the cover layer 120. For example, the FMTSIC 20 is oriented such that the piezoelectric layer 160 and the cover layer 120 are approximately parallel.

For ease of discussion, only one of each of the PMUT transmitters, PMUT receivers, and PMFEs is shown in FIG. 3. However, a typical FMTSIC can contain a plurality of PMUT transmitters, PMUT receivers, and PMFEs. The PMUT transmitters, the PMUT receivers, and the PMFEs are located along respective lateral positions along the thin-film piezoelectric stack 162. Each PMUT transmitter, PMUT receiver, and PMFE includes a respective portion of the thin-film piezoelectric stack. In a force-measuring device that does not have touch-sensing functionality, the PMUT transmitters and PMUT receivers can be omitted. An insulating support layer 152 supports the thin-film piezoelectric stack. Suitable materials for the support layer 152 are silicon, silicon nitride, and silicon oxide, for example. Suitable materials for the support layer 152 can also be a material that is included in the piezoelectric layer 160, which in this case is aluminum nitride.

Each PMFE 146 includes a respective portion of the thin-film piezoelectric stack 162. Each PMFE 146 includes a first PMFE electrode 176 positioned on a first side (bottom surface) 164 of the piezoelectric layer 160 and a second PMFE electrode 186 positioned on a second side (top surface) 166 opposite the first side. The first PMFE electrode 176 and the second PMFE electrode 186 are positioned on opposite sides of the piezoelectric layer 160. In each PMFE 146, the first PMFE electrode 176, the second PMFE electrode 186, and the portion of the piezoelectric layer 160 between them constitute a piezoelectric capacitor. The PMFEs are coupled to the signal processing circuitry 137 as explained in detail hereinbelow.

Figure 4:
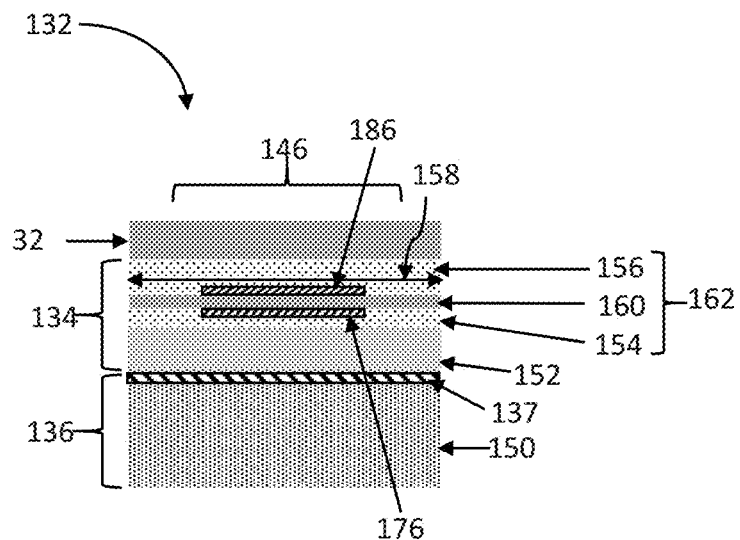
FIG. 4 is a schematic cross-sectional view of a piezoelectric micromechanical force-measuring element (PMFE).
Figure 10:
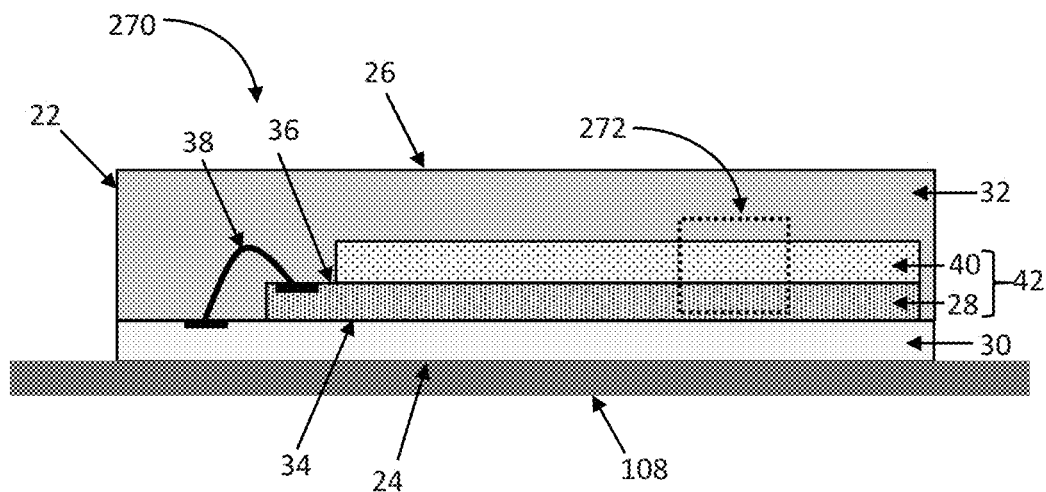
FIG. 10 is a schematic cross-sectional view of another force-measuring device.

A portion 132 of the FMTSIC 20 containing a PMFE 146 is shown in cross section in FIG. 4. Also shown is the ASIC portion 136 that is under the PMFE 146 and the encapsulating adhesive 32 that is above the PMFE 146. FIG. 10 shows the PMFE in a quiescent state, in which there is no flexing of the piezoelectric stack 162. In the quiescent state, there is no voltage generated between the PMFE electrodes (176, 186).

Figure 5:
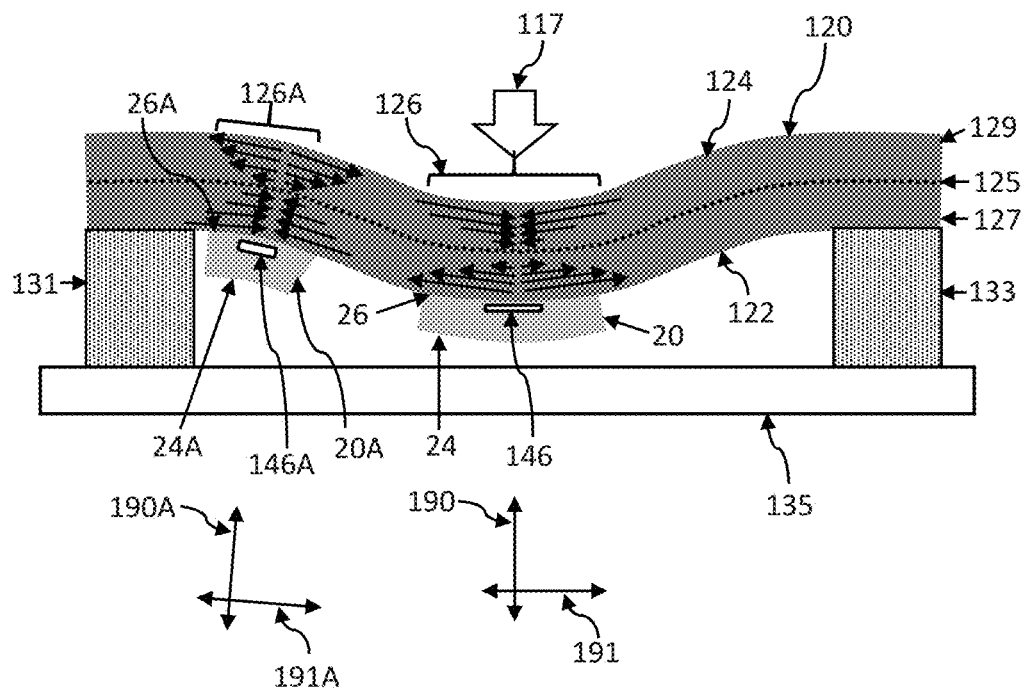
FIGS. 5, 6, and 7 are schematic side views of force-measuring and touch-sensing integrated circuits (FMTSICs) and a cover layer, attached to each other and undergoing deformation.
Figure 6:
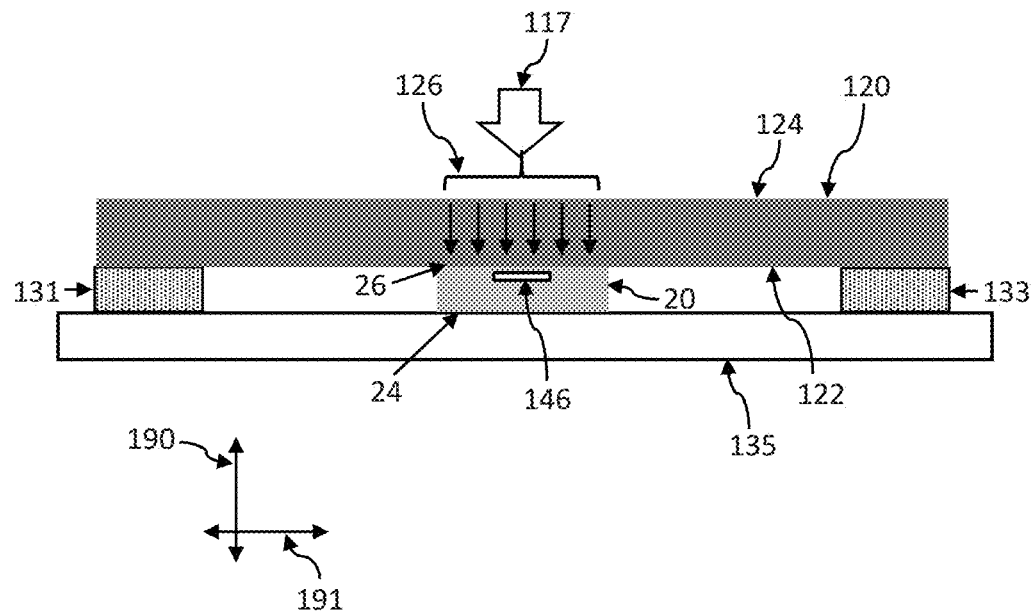
Figure 7:
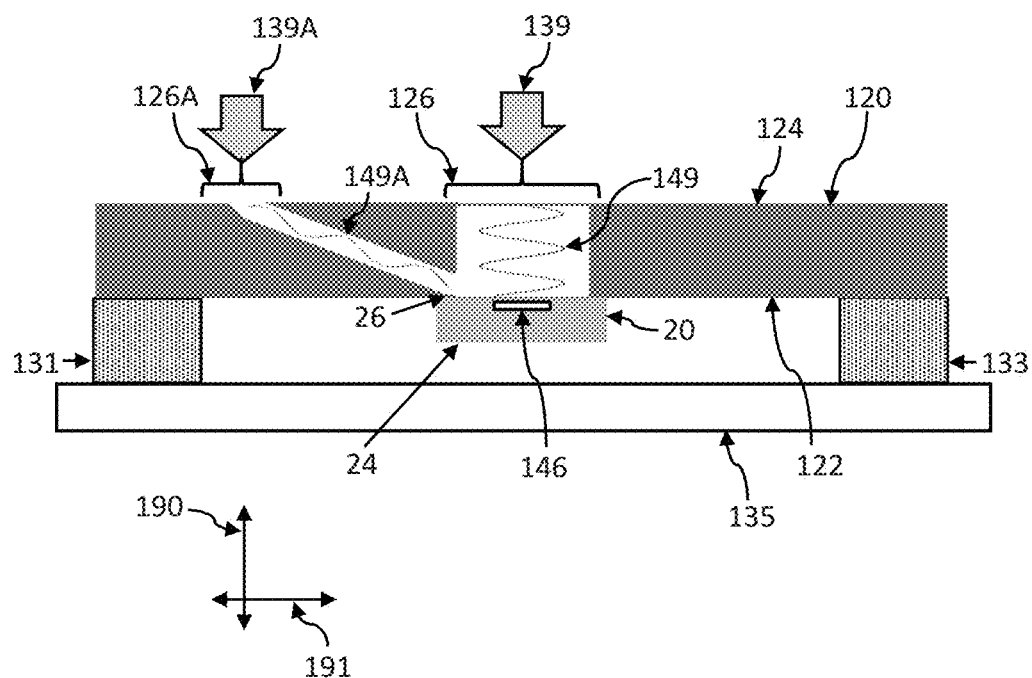

FIGS. 5, 6, and 7 are schematic side views of an FMTSIC 20 and a cover layer 120 attached to or adhered to (coupled to) each other. A top surface (ultrasound transmission surface) 26 of FMTSIC 20 is coupled to inner surface 122 of the cover layer 120. FMTSIC 20 and cover layer 120 overlie a rigid substrate 135. For ease of viewing, other components of system 100 (e.g., flexible circuit 108, ICs 114) have been omitted. FMTSIC 20 includes PMFEs 146. In the examples shown, two anchor posts 131, 133 fix the two ends of the cover layer 120 to the substrate 135.

In the example of FIG. 5, FMTSIC 20 is not anchored to the rigid substrate 135 and can move with the cover layer 120 when the cover layer 120 is deflected upwards or downwards. A downward force 117, shown as a downward arrow, is applied by a finger (or another object) pressing against the outer surface 124 of the cover layer 120 at the sense region 126 for example. A finger pressing against or tapping the outer surface 124 are examples of touch excitation, or more generally, excitation. In the example shown in FIG. 5, the cover layer 120 is deflected in a first direction (e.g., downwards) in response to a touch excitation at the sense region 126. FMTSIC 20 is located approximately half-way between the anchor posts 131, 133 and sense region 126 overlaps FMTSIC 20. A neutral axis 125 is located within the cover layer 120. A lower portion 127 of the cover layer 120, below the neutral axis 125, is under tensile (positive) strain at the sense region 126, represented by outward pointing arrows, primarily along lateral direction 191, perpendicular to the normal direction 190. Normal direction 190 is normal to the piezoelectric layer 160. Normal direction 190 is approximately normal to a plane of the respective piezoelectric capacitor. The piezoelectric layer 160 has a built-in polarization (piezoelectric polarization) that is approximately parallel to normal direction 190. The lateral direction 191 is approximately parallel to the piezoelectric layer 160 at the respective location of the piezoelectric layer 160 (at region 126). An upper portion 129 of the cover layer 120, above the neutral axis 125, is under compressive (negative) strain at the sense region 126, represented by inward pointing arrows, primarily along lateral direction 191. Since FMTSIC 20 is coupled to the inner surface 122, adjacent to the lower portion 127, the PMFEs 146 are also under tensile (positive) strain. Typically, the entire FMTSIC 20 may be deflected under the applied downward force 117. In the example shown in FIG. 5, the PMFEs 146 are under a positive strain, and the respective portions of the piezoelectric layer 160 at the PMFEs 146 undergo expansion along a lateral direction 191. As a result, an electrical charge is generated at each PMFE (146) between the respective PMFE electrodes (176, 186). This electrical charge is detectable as a first deflection voltage $V_{d1}$ (corresponding to strain of a certain polarity and magnitude). The polarity of the first deflection voltage $V_{d1}$ at a PMFE depends upon the polarity of the strain (positive strain (tensile) or negative strain (compressive)) at the respective portion of the piezoelectric layer between the respective PMFE electrodes of the PMFE. The magnitude of the first deflection voltage $V_{d1}$ at a PMFE depends upon the magnitude of the strain at the respective portion of the piezoelectric layer between the respective PMFE electrodes of the PMFE. Subsequently, when the downward force 117 is no longer applied to the sense region 126, the cover layer 120 deflects in a second direction opposite the first direction (e.g., upwards). This is detectable as a second deflection voltage $V_{d2}$ (corresponding to strain of a certain polarity and magnitude). The polarity of the second deflection voltage $V_{d2}$ at a PMFE depends upon the polarity of the strain at the respective portion of the piezoelectric layer between the respective PMFE electrodes of the PMFE. The magnitude of the second deflection voltage $V_{d2}$ at a PMFE depends upon the magnitude of the strain at the respective portion of the piezoelectric layer between the respective PMFE electrodes of the PMFE.

FIG. 5 shows a second FMTSIC 20A, including PMFEs 146A. A top surface (ultrasound transmission surface) 26A of FMTSIC 20A is coupled to inner surface 122 of the cover layer 120. FMTSIC 20A overlies the rigid substrate 135 and is located at a second region 126A, between anchor post 131 and first FMTSIC 20. Note that FMTSIC 20A is laterally displaced from the location where the downward force 117 is applied to the outer surface 124 (at sense region 126). The lower portion 127 of the cover layer 120 is under compressive (negative) strain at the second region 126A, represented by inward pointing arrows, primarily along the lateral direction 191A, perpendicular to the normal direction 190A. The lateral direction 191A is approximately parallel to the piezoelectric layer 160 at the respective location of the piezoelectric layer 160 (at second region 126A). The upper portion 129 of the cover layer 120 is under tensile (positive) strain at the second region 126A, represented by outward pointing arrows, primarily along the lateral direction 191A.

Since FMTSIC 20A is coupled to the inner surface 122, adjacent to the lower portion 127, the PMFEs 146A are also under compressive (negative) strain. These examples illustrate that when the cover layer and the FMTSICs undergo deflection in response to a touch excitation at the outer surface, expansion and/or compression of the piezoelectric layer along the lateral direction may be induced by the deflection of the cover layer.

In the example shown in FIG. 6, the bottom surface 24 of FMTSIC 20 is anchored to the rigid substrate 135. When downward force 117 is applied to the outer surface 124 of the cover layer 120 at sense region 126, the portion of the cover layer 120 at the sense region 126 transmits the downward force along normal direction 190. The portion of the cover layer 120 at the sense region 126 and the FMTSIC 20 undergo compression along normal direction 190. Consequently, the PMFEs 146 including piezoelectric layer 160 are compressed along the normal direction 190, approximately normal to the piezoelectric layer 160. As a result, an electrical charge is generated between the PMFE electrodes (176, 186). This electrical charge is detectable as a voltage $V_c$ (corresponding to a strain of a certain polarity and magnitude) between the PMFE electrodes. The downward force 117 that causes this compression is applied during a touch excitation, such as tapping at or pressing against the outer surface 124. The pressing or the tapping can be repetitive. Typically, the entire FMTSIC 20 may undergo compression. Subsequently, the piezoelectric layer 160 relaxes from the compressed state. In other cases, there may also be compression along a lateral direction 191, or along other directions.

In the example shown in FIG. 7, FMTSIC 20 is not anchored to the rigid substrate 135. A downward force 139, shown as a downward arrow, is applied to the outer surface 124 of the cover layer 120 at the sense region 126. The downward force 139 is generated as a result of an impact of touch excitation at the sense region 126. For example, the downward force 139 is generated as a result of the impact of a finger (or another object) tapping the outer surface at the sense region 126. The touch excitation (e.g., tapping) can be repetitive. The impact of the touch excitation (e.g., tapping) generates elastic waves that travel outward from the location of the impact (on the outer surface 124 at sense region 126) and at least some of the elastic waves travel toward the inner surface 122. Accordingly, at least some portion 149 of the elastic waves are incident on the FMTSIC 20.

In general, an impact of a touch excitation (e.g., tapping) on a surface of a stack (e.g., cover layer) can generate different types of waves including pressure waves, shear waves, surface waves and Lamb waves. Pressure waves, shear waves, and surface waves are in a class of waves called elastic waves. Pressure waves (also called primary waves or P-waves) are waves in which the molecular oscillations (particle oscillations) are parallel to the direction of propagation of the waves. Shear waves (also called secondary waves or S-waves) are waves in which the molecular oscillations (particle oscillations) are perpendicular to the direction of propagation of the waves. Pressure waves and shear waves travel radially outwards from the location of impact. Surface waves are waves in which the energy of the waves are trapped within a short depth from the surface and the waves propagate along the surface of the stack. Lamb waves are elastic waves that can propagate in plates. When an object (e.g., a finger) impacts a surface of a stack, different types of elastic waves can be generated depending upon the specifics of the impact (e.g., speed, angle, duration of contact, details of the contact surface), the relevant material properties (e.g., material properties of the object and the stack), and boundary conditions. For example, pressure waves can be generated when an impact of a touch excitation at the outer surface is approximately normal to the outer surface. For example, shear waves can be generated when an impact of a touch excitation at the outer surface has a component parallel to the outer surface, such as a finger hitting the outer surface at an oblique angle or a finger rubbing against the outer surface. Some of these elastic waves can propagate towards the FMTSIC 20 and PMFEs 146. If the stack is sufficiently thin, then some portion of surface waves can propagate towards the FMTSIC 20 and PMFEs 146 and be detected by the PMFEs 146.

Accordingly, when elastic waves 149 are incident on the FMTSIC 20 and PMFEs 146, the elastic waves induce time-dependent oscillatory deformation to the piezoelectric layer 160 at the PMFE 146. This oscillatory deformation can include: lateral deformation (compression and expansion along the lateral direction 191 approximately parallel to piezoelectric layer 160), normal deformation (compression and expansion along the normal direction 190 approximately normal to the piezoelectric layer 160), and shear deformation. As a result, time-varying electrical charges are generated at each PMFE (146) between the respective PMFE electrodes (176, 186). These time-varying electrical charges are detectable as time-varying voltage signals. The signal processing circuitry amplifies and processes these time-varying voltage signals. Typically, the time-dependent oscillatory deformations induced by an impact of a touch excitation are in a frequency range of 10 Hz to 1 MHz. For example, suppose that elastic waves 149 include pressure waves incident on the PMFEs 146 along the normal direction 190; these pressure waves may induce compression (under a positive pressure wave) and expansion (under a negative pressure wave) of the piezoelectric layer 160 along the normal direction 190. As another example, suppose that elastic waves 149 include shear waves incident on the PMFEs 146 along the normal direction 190; these shear waves may induce compression and expansion of the piezoelectric layer 160 along the lateral direction 191.

Consider another case in which a downward force 139A, shown as a downward arrow, is applied to the outer surface 124 at a second region 126A, between anchor post 131 and FMTSIC 20. The downward force 139A is generated as a result of an impact of touch excitation at the second region 126A. The impact of the touch excitation generates elastic waves that travel outward from the location of the impact (region 126A) and at least some of the elastic waves travel towards the inner surface 122. Accordingly, at least some portion 149A of the elastic waves are incident on the FMTSIC 20, causing the piezoelectric layer 160 to undergo time-dependent oscillatory deformation. As a result, time-varying electrical charges are generated at each PMFE (146) between the respective PMFE electrodes (176, 186). These time-varying electrical charges are detectable as time-varying voltage signals, although the impact of the touch excitation occurred at a second region 126A that is laterally displaced from the sense region 126.

Elastic waves 149A that reach FMTSIC 20 from region 126A may be weaker (for example, smaller in amplitude) than elastic waves 149 that reach FMTSIC 20 from sense region 126, because of a greater distance between the location of impact and the FMTSIC. An array of PMFEs can be configured to be a position-sensitive input device, sensitive to a location of the impact (e.g., tapping) of a touch excitation. An array of PMFEs can be an array of PMFEs in a single FMTSIC or arrays of PMFEs in multiple FMTSICs.

For example, a table input apparatus could have an array of FMTSICs located at respective lateral positions underneath the table's top surface, in which each FMTSIC would contain at least one PMFE and preferably multiple PMFEs. The signal processing circuitry can be configured to amplify and process the time-varying voltage signals from the PMFEs and analyze some features of those time-varying voltage signals. Examples of features of time-varying voltage signals are: (1) amplitudes of the time-varying voltage signals, and (2) the relative timing of time-varying voltage signals (the "time-of-flight"). For example, a PMFE exhibiting a shorter time-of-flight is closer to the location of impact than another PMFE exhibiting a longer time-of-flight. The signal processing circuitry can analyze features of time-varying signals (e.g., amplitude and/or time-of-flight) from the PMFEs in an array of PMFEs to estimate a location of impact of a touch excitation.

In operation, PMFE 146 is configured to output voltage signals between the PMFE electrodes (176, 186) in accordance with a time-varying strain at the respective portion of the piezoelectric layer between the PMFE electrodes (176, 186) resulting from a low-frequency mechanical deformation. A touch excitation at the cover layer or at another component mechanically coupled to the cover layer causes a low-frequency mechanical deformation (of the cover layer or other component at the point of excitation). The touch excitation induces effects including deflection (as illustrated in FIG. 5), compression (as illustrated in FIG. 6), and/or elastic-wave oscillations (as illustrated in FIG. 7). In an actual touch event, more than one of these effects may be observable. Consider tapping by a finger as an example of a touch excitation. As the finger impacts the outer surface 124, elastic waves are generated which are detectable as time-varying voltage signals at the PMFEs (FIG. 7). Elastic waves are generated by the impact of the touch excitation. Subsequently, as the finger presses against the cover layer, the FMTSIC undergoes deflection (FIG. 5). There is expansion or compression of the piezoelectric layer along a lateral direction. The low-frequency mechanical deformation can be caused by a finger pressing against or tapping at outer surface of the cover layer 120, to which the FMTSIC 20 is attached (coupled). The PMFE 146 is coupled to the signal processing circuitry 137. By amplifying and processing the voltage signals from the PMFE at the signal processing circuitry, the strain that results from the mechanical deformation of the piezoelectric layer can be measured.

It is possible to adjust the relative amplitudes of the PMFE voltage signals attributable to the elastic-wave oscillations (FIG. 7) and lateral expansion and compression due to deflection (FIG. 5). For example, one can choose the cover layer to be more or less deformable. For example, the cover layer 120 of FIG. 7 may be thicker and/or made of more rigid material than the cover layer 120 of FIG. 5.

PMFE 146 is configured to output voltage signals between the PMFE electrodes (176, 186) in accordance with a time-varying strain at the respective portion of the piezoelectric layer between the PMFE electrodes (176, 186) resulting from a low-frequency mechanical deformation. Typically, the low-frequency deformation is induced by touch excitation which is not repetitive (repetition rate is effectively 0 Hz) or is repetitive having a repetition rate of 100 Hz or less, or 10 Hz or less. These repetition rates correspond to the repetition rates of a repetitive touch excitation, e.g., a finger repeatedly pressing against or tapping the sense region.

A touch excitation, or more generally, excitation can occur somewhere other than at the sense region. Consider an implementation of FMTSICs in a portable apparatus, such as a smartphone. In some cases, the cover layer, to which the FMTSIC is coupled, can be a portion of the smartphone housing, and in other cases, the housing and the cover layer can be attached to each other, such that forces applied to the housing can be transmitted to the cover layer. We can refer to both cases as a component (e.g., housing) being mechanically coupled to the cover layer. Excitation such as bending of, twisting of, pinching of, typing at, and tapping at the housing can also cause low-frequency mechanical deformation. For example, typing at the housing can include typing at a touch panel of the smartphone. There can be a time-varying strain (force) at a respective portion of the piezoelectric layer at a PMFE resulting from this low-frequency deformation.

Figure 8:
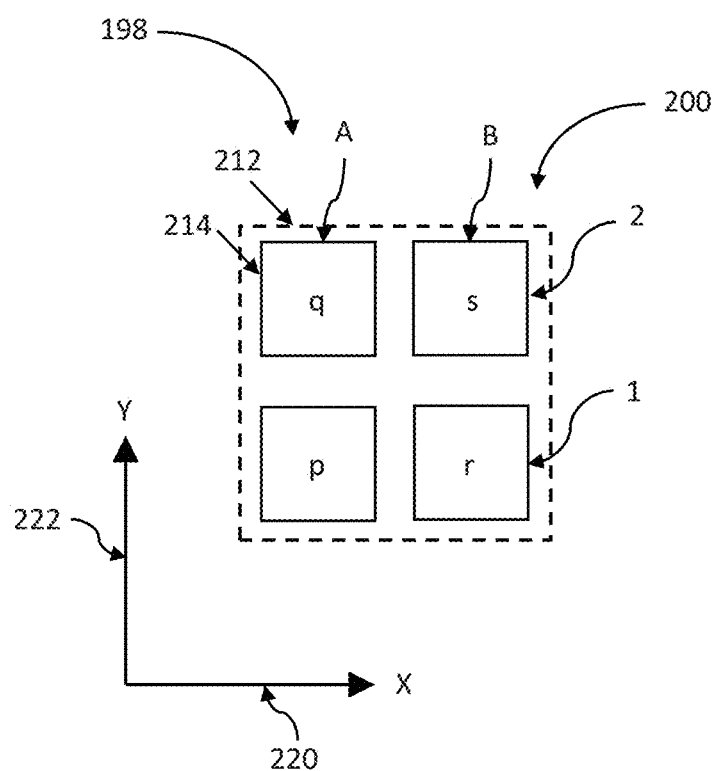
FIG. 8 is a schematic top view of a PMFE array of a force-measuring device.

A force-measuring device may contain multiple PMFEs. FIG. 8 is a top view of an example MEMS portion 200 of a force-measuring device 198. The MEMS portion includes four PMFEs (214, locations identified as p, q, r, and s) arranged in a two-dimensional array 212 extending along the X-axis (220) and Y-axis (222). The PMFEs are arranged in columns (A and B) and rows (1 and 2). In the example shown, the two-dimensional PMFE array 212 has a square outer perimeter, but in other examples the outer perimeter can have other shapes such as a rectangle. Each PMFE is sensitive to a mechanical deformation (measurable as a strain) at its respective X and Y location, resulting from a particular applied force (e.g., touch excitation). In this sense, the PMFE array 212 achieves a two-dimensional positional resolution of measurement of the applied force.

Figure 9:
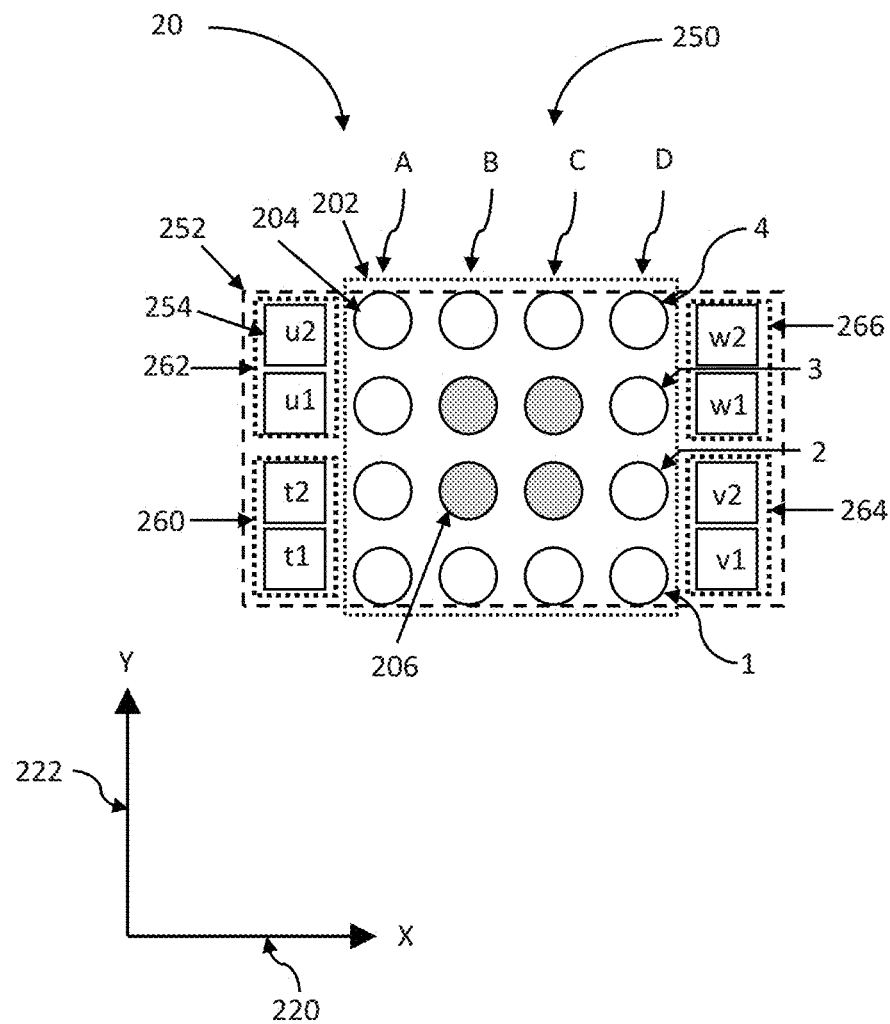
FIG. 9 is a schematic top view of a MEMS portion of a force-measuring touch-sensing integrated circuit (FMTSIC).

An FMTSIC can contain multiple PMUT transmitters, PMUT receivers, and PMFEs. FIG. 9 is a top view of a MEMS portion 250 of an FMTSIC 20. The PMUTs (PMUT transmitters 204 shown as white circles and PMUT receivers 206 shown as grey circles) are arranged in a two-dimensional array, extending along the X-axis (220) and Y-axis (222). The PMUTs are arranged in columns (A, B, C, and D) and rows (1, 2, 3, and 4).

The MEMS portion 250 includes eight PMFEs (254) arranged in a two-dimensional array 252. The PMFE array 252 has an opening, which is devoid of PMFEs, in which the PMUT array 202 is disposed. The PMFEs are arranged into four sets (260, 262, 264, and 266), where each set is associated with a different X and Y location. Therefore, the PMFE array 252 achieves a two-dimensional positional resolution of applied forces measurement. The PMFE array enables calculation of force-resolution features, discussed hereinbelow. Each PMFE set contains two PMFEs. In the example shown, set 260 contains t1 and t2, set 262 contains u1 and u2, set 264 contains v1 and v2, and set 266 contains w1 and w2. The PMFEs in a set are electrically connected to each other. In this example, the piezoelectric capacitors constituting each PMFE in a set are connected to each other in series. An advantage to combining the touch-sensing (PMUTs) and force-measuring (PMFEs) functions into one integrated circuit device is that it becomes possible to distinguish between stationary objects that touch but do not apply significant force (e.g., water droplet on sense region 126) and moving objects that touch and apply significant force (e.g., finger).

FIG. 10 is a cross-sectional view of a force-measuring device 270. Force-measuring device 270 is an alternative to force-measuring device 20 (FIG. 2). Force-measuring device 270 is shown encased in a package 22, with an ultrasound transmission surface (top surface) 26 and electrical interconnection surface (bottom surface) 24. In the example shown, the force-measuring device 270 is an IC and can be implemented as an FMTSIC. The force-measuring device 270 includes a package substrate 30, semiconductor die (semiconductor chip) 28 mounted to the package substrate 30, a MEMS chip 40 on the semiconductor die 28, and an encapsulating adhesive 32, such as an epoxy adhesive. Force-measuring device 270 differs from force measuring device 20 (FIG. 2) in that it additionally includes a MEMS chip 40. The MEMS chip 40 and the semiconductor chip 28 are shown bonded together in a bonded chip assembly 42. This is an example of the semiconductor substrate and the MEMS substrate being attached to each other at their major surfaces. A selected portion 272 of the bonded chip assembly 42 is shown in cross-section in FIG. 11.

Figure 11:
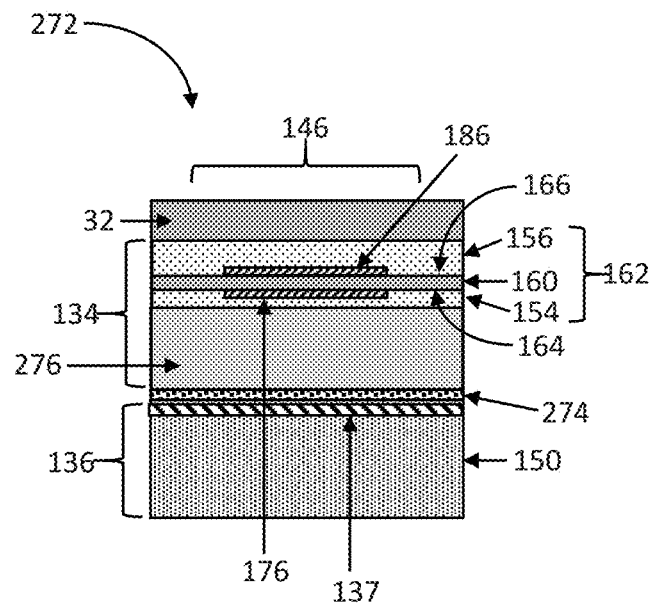
FIG. 11 is a schematic cross-sectional view of a PMFE of the force-measuring device of FIG. 10.

FIG. 11 is a schematic cross-sectional view of a portion 272 of the force-measuring device 270 of FIG. 10. The semiconductor die 28 includes an ASIC portion 136 and the MEMS chip includes a MEMS portion 134. The ASIC portion 136 consists of a semiconductor substrate 150 and signal processing circuitry 137 thereon. Typically, the semiconductor substrate is a silicon substrate, but other semiconductor substrates such as silicon-on-insulator (SOI) substrates can also be used. The MEMS portion 134 includes a MEMS substrate 276 and MEMS structures disposed on the MEMS substrate 276. Suitable MEMS substrates include silicon and glass. MEMS structures shown in FIG. 11 include the piezoelectric stack 162 (piezoelectric layer 160, bottom mechanical layer 154, top mechanical layer 156), a first PMFE electrode 176, and a second PMFE electrode 186. A wafer bond layer 274, located between the ASIC portion 136 and the MEMS portion 134, bonds the two portions together.

A bonded assembly including a MEMS portion and an ASIC portion can be formed as follows. MEMS structures are formed on a MEMS substrate, and signal processing circuitry is formed on a semiconductor substrate. Subsequently, the MEMS substrate and the semiconductor substrate are bonded together by a wafer-bonding process, resulting in a wafer bond layer (274) between the substrates. The resulting MEMS substrate-semiconductor substrate assembly is singulated to form a plurality of bonded chip assemblies 42 including a MEMS portion 40 and an ASIC portion 28. After the bonded chip assembly 42 is mounted to the package substrate 30, wire bond connections 38 are formed between the bonded chip assembly 42 and the package substrate 30. Then the entire assembly including the bonded chip assembly 42 and the package substrate 30 are molded (encapsulated) in an epoxy adhesive 32. Additional explanation is provided with reference to FIG. 18 hereinbelow.

Figure 12:
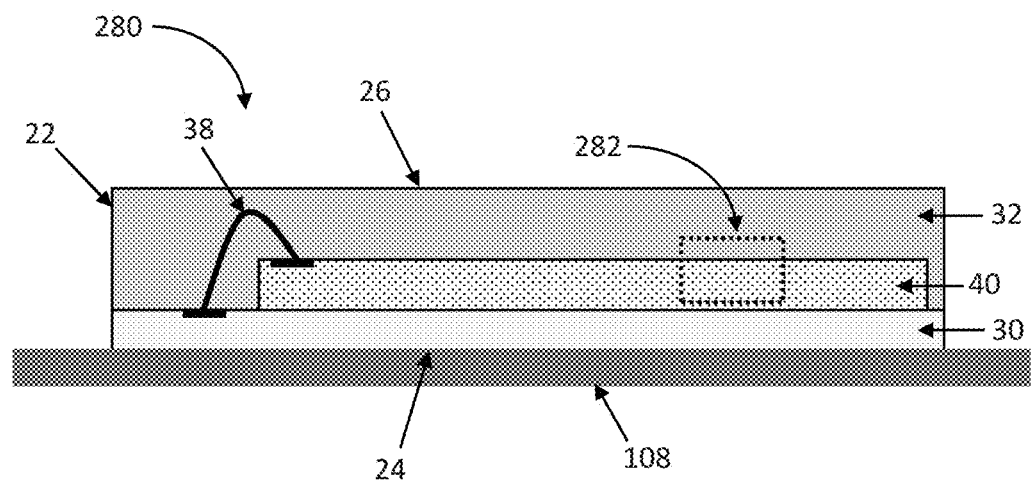
FIG. 12 is a schematic cross-sectional view of a MEMS device.

FIG. 12 is a cross-sectional view of a MEMS device 280. Unlike the force-measuring devices 20 (FIG. 2) and 270 (FIG. 10), MEMS device 280 itself is devoid of the signal processing circuitry necessary for operation of the PMFEs. However, when connected to the necessary signal processing circuitry, MEMS device 280 can be configured to operate as a force-measuring device. Referring to the example shown in FIG. 12, this signal processing circuitry can be contained in ICs 114, for example. Hence, MEMS device 280 is sometimes referred to as a force-measuring device. MEMS device 280 is shown encased in a package 22, with an ultrasound transmission surface or a top surface 26 and electrical interconnection surface (bottom surface) 24. The MEMS device 280 includes a package substrate 30, MEMS chip 40 mounted to the package substrate 30, and an encapsulating adhesive 32, such as an epoxy adhesive. A selected portion 282 of the MEMS chip is shown in cross-section in FIG. 13.

Figure 13:
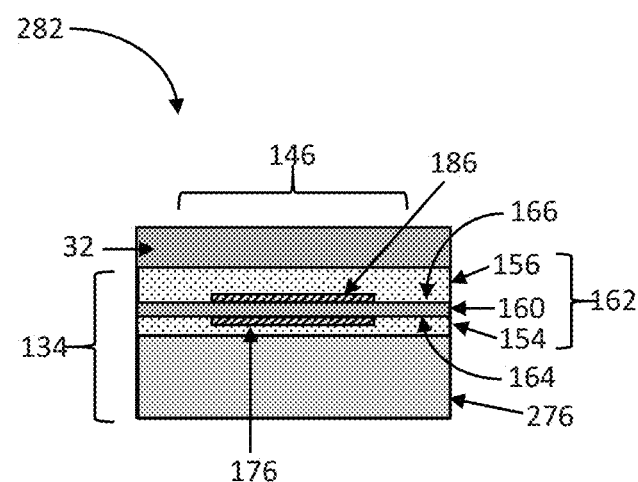
FIG. 13 is a schematic cross-sectional view of a PMFE of the MEMS device of FIG. 12.

FIG. 13 is a schematic cross-sectional view of a portion 282 of the MEMS device 280 of FIG. 12. The MEMS chip 40 includes a MEMS portion 134. The MEMS portion 134 includes a MEMS substrate 276 and MEMS structures disposed on the MEMS substrate 276. Suitable MEMS substrates include silicon and glass. MEMS structures shown in FIG. 13 include the piezoelectric stack 162 (piezoelectric layer 160, bottom mechanical layer 154, top mechanical layer 156), a first PMFE electrode 176, and a second PMFE electrode 186.

Figure 14:
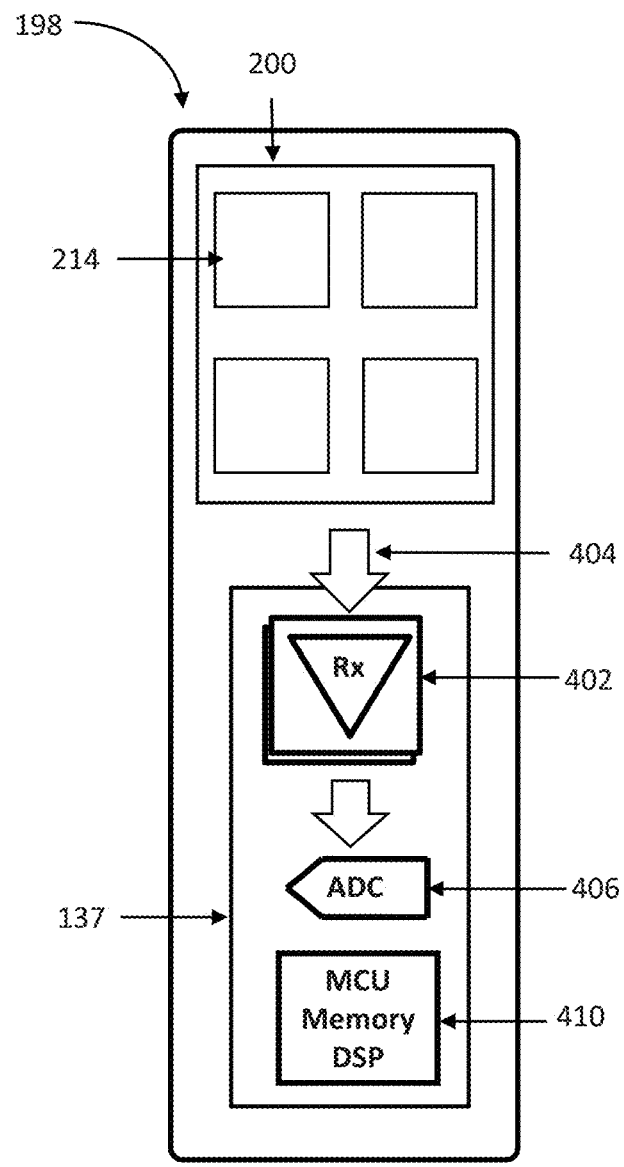
FIG. 14 is an electronics block diagram of a force-measuring device.

FIG. 14 is an electronics block diagram of the force-measuring device 198, including a MEMS portion 200 (FIG. 8) and signal processing circuitry 137. The MEMS portion includes PMFEs 214. The signal processing circuitry 137 includes amplifiers (402), analog-to-digital converters (ADCs) (406), and other circuit blocks (410). Voltage signals read from PMFEs 214 reach amplifiers 402 via electrical interconnections 404 and get amplified by the amplifiers 402. These amplified voltage signals are sent to ADC 406 to be converted to digital signals which can be processed or stored by other circuit blocks 410. The other circuit blocks 410 could be microcontrollers (MCUs), memories, and digital signal processors (DSPs), for example. Force-measuring device 198 is implemented as a force-measuring device that does not have touch-sensing functionality (hence, not an FMTSIC). In the case of force-measuring device 270, the signal processing circuitry would be present in the respective device. On the other hand, when implementing a force-measuring device using a MEMS device 280 (FIG. 12), the signal processing circuitry would be implemented somewhere outside of the MEMS device 280, such as in another IC 114 (FIG. 1).

Figure 15:
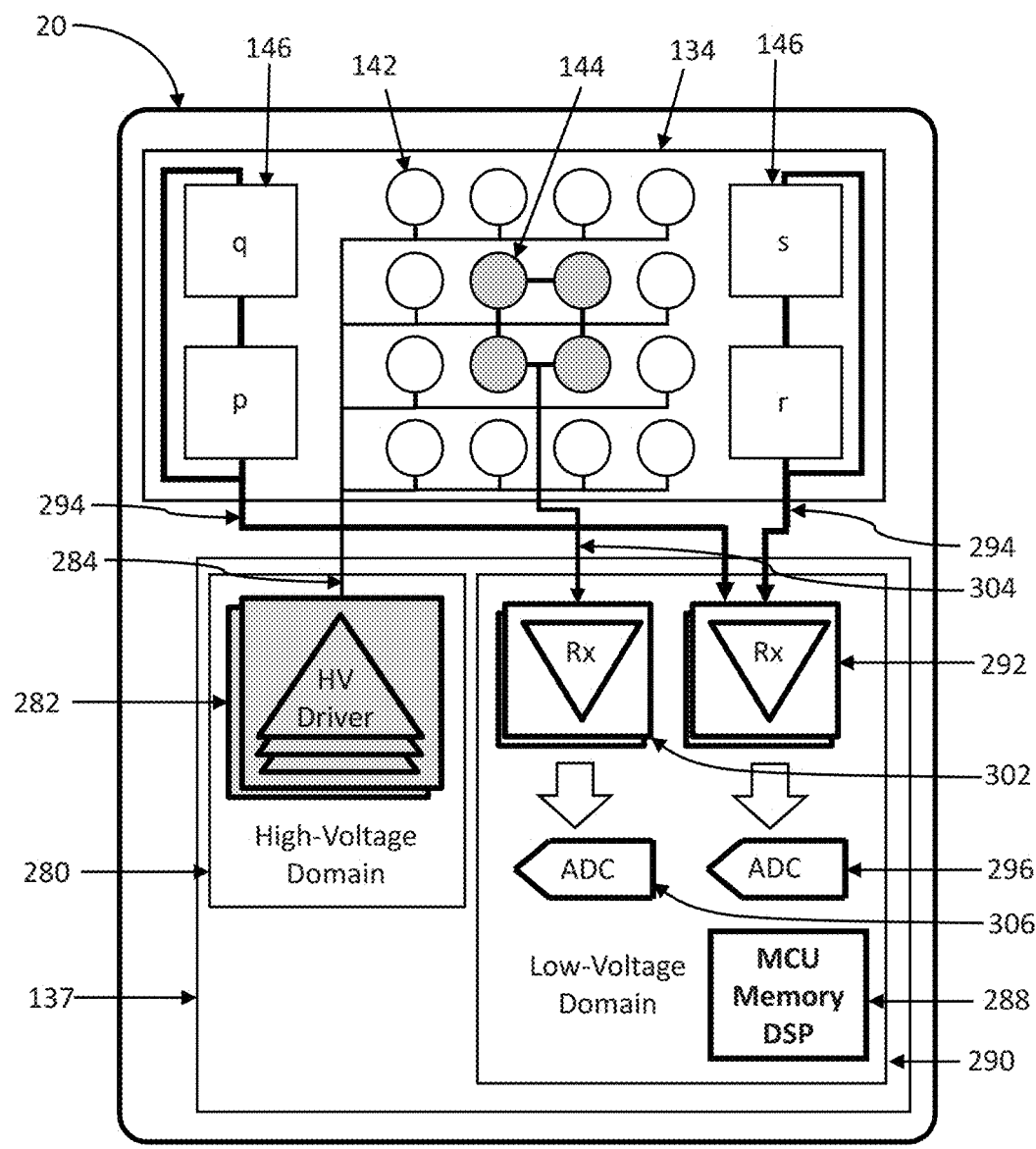
FIG. 15 is an electronics block diagram of a force-measuring device, implemented as an FMTSIC.

FIG. 15 is an electronics block diagram of the FMTSIC 20, including a MEMS portion 134 and signal processing circuitry 137. The MEMS portion includes PMUT transmitters 142, PMUT receivers 144, and PMFEs 146. Signal processing circuitry 137 includes a high-voltage domain 280 and a low-voltage domain 290. The high-voltage domain is capable of operating at higher voltages required for driving the PMUT transmitters. The high-voltage domain includes high-voltage transceiver circuitry 282, including high-voltage drivers. The high-voltage transceiver circuitry 282 is connected to the first PMUT electrodes and the second PMUT electrodes of the PMUT transmitters, via electrical interconnections (wiring) 284. The high-voltage transceiver is configured to output voltage pulses of 5 V or greater, depending on the requirements of the PMUT transmitters. The processing circuit blocks 288 are electrically connected to the high-voltage transceiver circuitry 282 and the analog-to-digital converters (ADCs) (296, 306). The processing circuit blocks 288 generate time-varying signals that are transmitted to the high-voltage transceiver circuitry 282. The high-voltage transceiver circuitry 282 transmits high-voltage signals to the PMUT transmitters 142 in accordance with the time-varying signals from the processing circuit blocks 288.

The low-voltage domain 290 includes amplifiers (292, 302) and analog-to-digital converters (ADCs) (296, 306). The processing circuit blocks 288 are also contained in the low-voltage domain 290. Voltage signals output by the PMUT receivers 144 (represented by gray circles) reach amplifiers 302 via electrical interconnections (wiring) 304 and get amplified by the amplifiers 302. The amplified voltage signals are sent to ADC 306 to be converted to digital signals which can be processed or stored by processing circuit blocks 288. Similarly, voltage signals output by PMFEs 146 reach amplifiers 292 via electrical interconnections (wiring) 294 and get amplified by the amplifiers 292. These amplified voltage signals are sent to ADC 296 to be converted to digital signals which can be processed or stored by processing circuit blocks 288. The processing circuit blocks 288 could be microcontrollers (MCUs), memories, and digital signal processors (DSPs), for example. The wiring (284, 294, 304) traverses the semiconductor substrate, which contains the signal processing circuitry 137, and the MEMS portion 134, which contains the PMFEs 146, the PMUT transmitters 142, and the PMUT receivers 144.

In the example shown (FIG. 15), the piezoelectric capacitors constituting the PMUT receivers 144 are connected to each other in parallel. Since the capacitances of these PMUT receivers are added together, this arrangement of PMUT receivers is less sensitive to the effects of parasitic capacitance. Accordingly, there is a unified voltage signal transmitted from the PMUT receivers 144 to the amplifiers 302. The piezoelectric capacitors constituting the PMUT transmitters 142 are connected in parallel. Accordingly, there is a time-varying signal transmitted from the high-voltage transceiver circuitry 282 to the PMUT transmitters 142. The PMFEs 146 are grouped into two sets (p and q on the left side, r and s on the right side), and the PMFEs in each set are connected to each other in series. Accordingly, there are two sets of PMFE signals transmitted from the PMFEs 146 to the amplifiers 292.

The three implementations of the force-measuring device shown in FIGS. 2, 10, and 12 employed piezoelectric micromechanical force-measuring elements. However, a force-measuring device need not be limited to micromechanical elements and/or piezoelectric elements. For example, a piezoelectric capacitor comprising a non-micromechanical piezoelectric film and electrodes on opposite sides of the film or a piezoresistive strain gauge can be used to carry out the force-measuring functionality of a force-measuring device.

FIG. 16 is a schematic view of an input system 500 having force-measuring and touch-sensing capabilities (force-measuring and touch-sensing system 500). System 500 is an example of an electronic apparatus that can undergo testing and calibration (FIG. 28) or from which a mapping of force transmission from a plurality of force-imparting points to each force-measuring device can be obtained (FIG. 31). The force-measuring and touch-sensing system 500 includes one or more force-measuring devices 102 (five are shown) and a capacitive touch panel assembly 520. In other examples, it is possible for a system to have less than five or more than five force-measuring devices. In the example shown in FIG. 16, each of the force-measuring devices 102 is shown in the form of a packaged chip. The force-measuring device chips 102 are mounted to a flexible circuit substrate 108 (e.g., an FPC or flexible printed circuit). The flexible circuit substrate 108 is electrically and mechanically connected to a printed circuit board (PCB) 112 via a connector 116. Additionally, a touch panel controller 534 and other integrated circuits (other ICs) 514 are mounted on the PCB 112. Generally, signal processing circuitry can be implemented in the force-measuring device 102, the touch panel controller 534, and/or the other ICs 114. The signal processing circuitry can be implemented in a single IC, or in multiple ICs. Other ICs 114 can include a microcontroller (MCU), microprocessor (MPU), and/or a digital signal processor (DSP), for example.

In the example shown, the capacitive touch panel assembly 520 is embedded in a cover layer 120. The touch panel assembly 520 has an exposed outer surface 524 and an inner surface 522. The force-measuring devices 102 are adhered to the inner surface 522 of the touch panel assembly 520 by a layer of adhesive 110. The choice of adhesive 110 is not particularly limited as long as the devices 102 remain attached to the cover layer. The adhesive 110, the cover layer 120, the force-measuring devices 102, and the flexible circuit substrate 108 have been discussed with reference to FIG. 1.

The capacitive touch panel assembly 520 includes a grid region 530 containing wiring traces 540 extending in the X-direction (220) and wiring traces 542 extending in the Y-direction (into the page, perpendicular to the X-direction 220 and Z-direction 224). The capacitive touch panel assembly 520 is coupled to the touch panel controller IC 534 via a connector 532. For example, the touch panel controller 534 contains signal processing circuitry that measures the capacitance at each intersection of the X-direction wiring traces 540 and Y-direction wiring traces 542. For example, when a finger 118 touches a region of the capacitive touch panel assembly 520, the measured capacitance in the touched region changes Preferably, the capacitive touch panel assembly also includes a display, such as a deformable OLED (organic light-emitting diode) display or a deformable liquid crystal display (LCD). Preferably, the capacitive touch panel assembly 520 is sufficiently deformable such that when a force is imparted to the touch panel assembly on the outer surface 524, the force-measuring devices 102 that are adhered to the capacitive touch panel assembly 520 at its inner surface 522 also undergo deformation.

Figure 17:
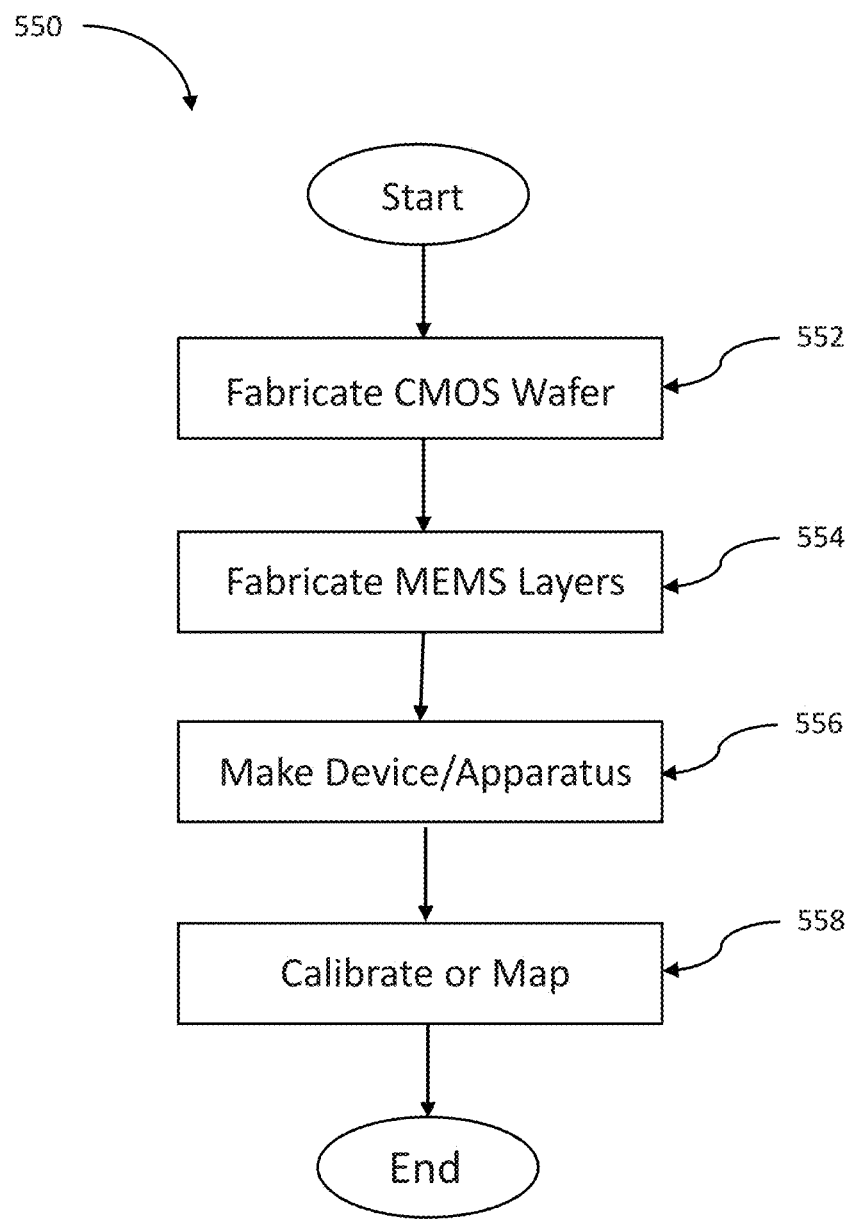
FIGS. 17, 18, and 19 are flow diagrams of methods of making force-measuring devices, making an electronic apparatus incorporating the force-measuring device, and calibrating the force-measuring device or mapping data of force transmission to the force-measuring device.

FIG. 17 shows a flow diagram of a method 550 of making force-measuring device (20 of FIG. 2), making an electronic apparatus incorporating the force-measuring device, and calibrating the force-measuring device or mapping data of force transmission to the force-measuring device. At step 552, the CMOS wafer is fabricated using a semiconductor substrate. The ASIC portion 136 including signal processing circuitry 137 is fabricated on a semiconductor substrate (wafer) 150 using a CMOS fabrication process. At step 554, the MEMS portion 134 is fabricated on top of the ASIC portion 136. At step 556, the force-measuring devices (20) are made. This step 556 includes, for example, the singulation of the wafer into dies, the mounting of dies onto a package substrate, and the packaging of the die including application of an epoxy adhesive. At step 556, the force-measuring devices (20) are optionally incorporated into an electronic apparatus (640). This may include: connecting force-measuring devices to other components in the electronic apparatus; electronically coupling the force-measuring devices to other circuit elements in the electronic apparatus; and attaching the force-measuring devices to an interior surface of an external housing of the electronic apparatus. For example, the electronic apparatus 640 can be a mobile appliance (e.g., Smartphone, tablet computer, laptop computer, display) or any other electronic apparatus, such as a user-interface subsystem in a mobile appliance, a household appliance (e.g., washing machine, drier, light switches, air conditioner, refrigerator, oven, remote controller devices), a medical appliance, an industrial appliance, an office appliance, an automobile, or an airplane. At step 558, the force-measuring device undergoes calibration, either in its standalone state or after incorporation into an electronic apparatus, according to method 800 (FIG. 28) or a mapping of data of force transmission from a plurality of force-imparting points to the force-measurement device is obtained according to method 870 (FIG. 31).

Figure 18:
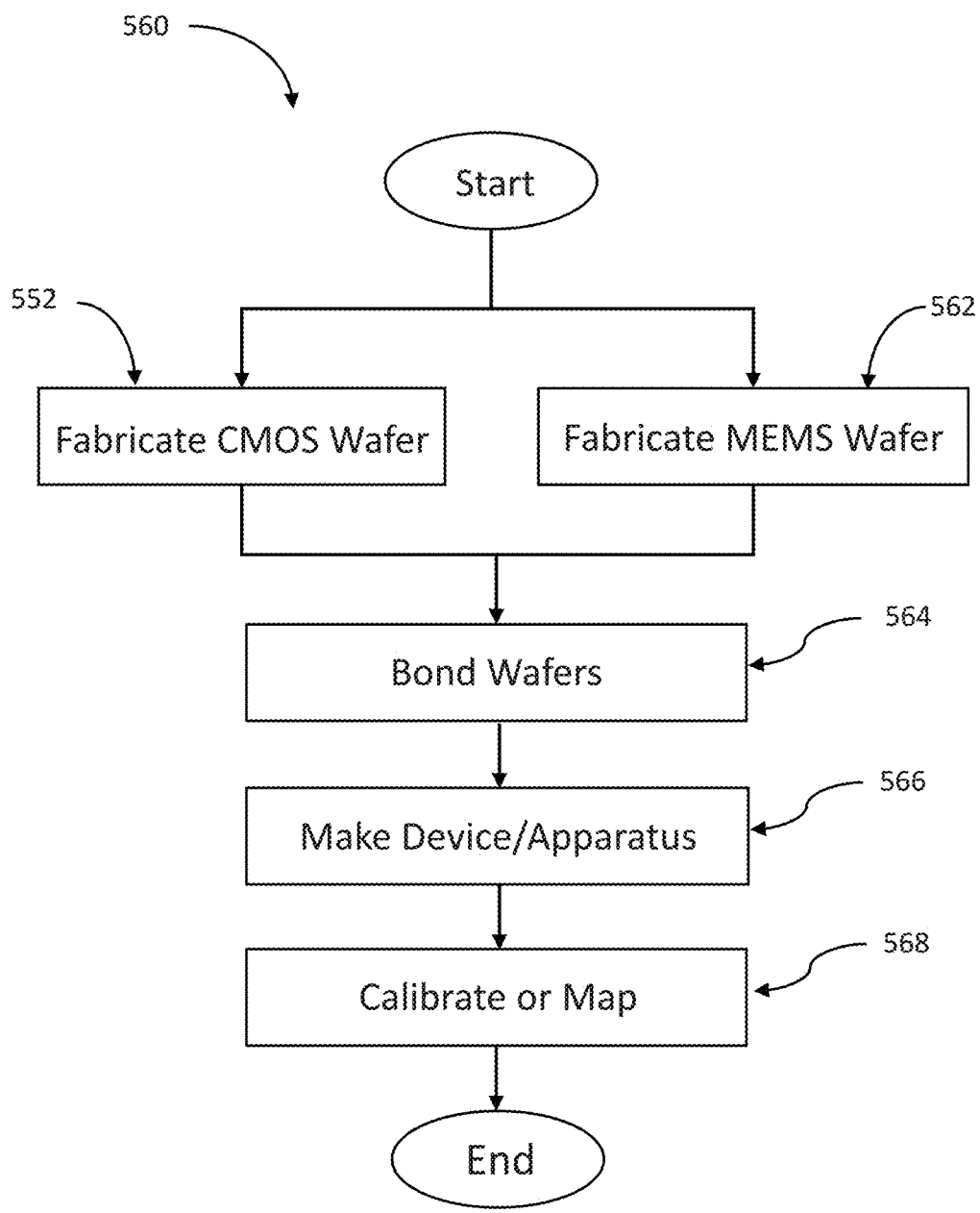

FIG. 18 shows a flow diagram of a method 560 of making force-measuring device (270 of FIG. 10), making an electronic apparatus incorporating the force-measuring device, and calibrating the force-measuring device or mapping data of force transmission to the force-measuring device. At step 552, the CMOS wafer is fabricated using a semiconductor substrate. This step has been described with reference to FIG. 17. At step 562, a MEMS wafer is fabricated using a MEMS substrate, such as silicon or glass. Step 562 includes the fabrication of PFMEs (more generally, MEMS structures). At step 564, the CMOS wafer and the MEMS wafer are attached by wafer bonding, resulting in the semiconductor substrate and the MEMS substrate being attached to each other at their major surfaces. At step 566, the force-measuring devices (270) are made. This step 566 includes, for example, the singulation of the bonded wafer into dies, the mounting of dies onto a package substrate, and the packaging of the die including application of an epoxy adhesive. The making of the force-measuring device is complete at the end of step 566. At step 566, the force-measuring devices (270) are optionally incorporated into an electronic apparatus (640), as explained with reference to FIG. 17. At step 568, the force-measuring device undergoes calibration, either in its standalone state or after incorporation into an electronic apparatus, according to method 800 (FIG. 28) or a mapping of data of force transmission from a plurality of force-imparting points to the force-measurement device is obtained according to method 870 (FIG. 31).

Figure 19:
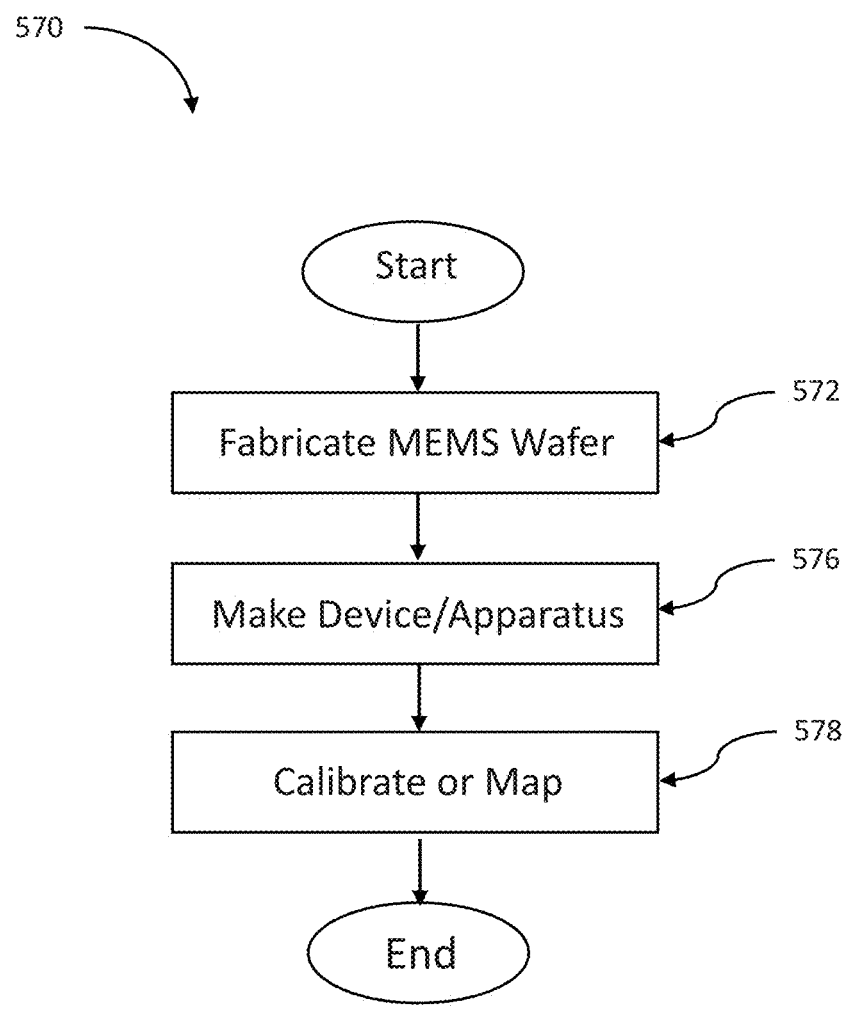

FIG. 19 shows a flow diagram of a method 570 of making force-measuring device (280 of FIG. 12), making an electronic apparatus incorporating the force-measuring device, and calibrating the force-measuring device or mapping data of force transmission to the force-measuring device. At step 572, a MEMS wafer is fabricated using a MEMS substrate, such as silicon or glass. Step 572 includes the fabrication of PFMEs (more generally, MEMS structures). At step 576, the MEMS chips (280) are made. This step 576 includes, for example, the singulation of the MEMS wafer into dies, the mounting of dies onto a package substrate, and the packaging of the die including application of an epoxy adhesive. Since the MEMS device 280 does not include the signal processing circuitry, the signal processing circuitry is provided in other ICs. At step 576, the MEMS device is electronically coupled to the signal processing circuitry. Upon completion of step 576, the MEMS device 280 has been configured as a force-measuring device. At step 576, the force-measuring devices (280) are optionally incorporated into an electronic apparatus (640), as explained with reference to FIG. 17. At step 578, the force-measuring device, either in its standalone state or after incorporation into an electronic apparatus, undergoes calibration, namely the method 800 (FIG. 28). At step 578, the force-measuring device undergoes calibration, either in its standalone state or after incorporation into an electronic apparatus, according to method 800 (FIG. 28) or a mapping of data of force transmission from a plurality of force-imparting points to the force-measurement device is obtained according to method 870 (FIG. 31).

What is claimed is:

1. A method of calibrating a force-measuring device, comprising the steps of:
(A) configuring a force-measuring device testing system, comprising: (1) a linear actuator assembly comprising a Z-axis actuator and a slider, (2) a load cell secured to the slider, such that actuation of the Z-axis actuator is mechanically coupled to a vertical movement of the load cell via the slider, (3) a controller electronically coupled to the Z-axis actuator, and (4) a first signal processing circuitry electronically coupled to the load cell and the controller, configured to measure force signals at the load cell and output amplified force signals to the controller;
(B) configuring a sample stage, a force-measuring device controller, and a sample comprising a force-measuring device, the sample stage retaining the sample, the force-measuring device comprising a second signal processing circuitry, the force-measuring device controller electronically coupled to the second signal processing circuitry of the force-measuring device of the sample, the sample and force-measuring device being removable from the force-measuring device testing system;
(C) obtaining a desired force-trajectory;
(D) operating the force-measuring device testing system;
(E) reading, by the force-measuring device controller, a digital transducer data output from the second signal processing circuitry of the force-measuring device when a time-varying applied force is imparted to the sample; and
(F) adjusting or selecting, by the force-measuring device controller, a gain of the force-measuring device in accordance with the digital transducer data;
wherein the step (D) of operating the force-measuring device testing system comprises the sub-steps of:
(D1) calculating, by the controller, an actuation of the Z-axis actuator in accordance with the desired force trajectory and an elastic parameter;
(D2) controlling, by the controller, actuation of the Z-axis actuator in accordance with the calculated actuation;
(D3) imparting, by the load cell, the time-varying applied force to the sample during the vertical movement of the load cell, the time-varying applied force being imparted via at least one elastic member positioned between the load cell and the sample;
(D4) measuring, by the first signal processing circuitry of the load cell, force signals at the load cell and amplifying the force signals;
(D5) outputting, by the first signal processing circuitry of the load cell, amplified force signals to the controller;
(D6) obtaining, by the controller, digital force signals in accordance with the amplified force signals;
(D7) optionally updating, by the controller, the elastic parameter in accordance with a deviation of the digital force signals from the desired force trajectory; and
(D8) repeatedly executing steps (D1) through (D7), inclusive, until the desired force trajectory has been executed; and
wherein the elastic parameter relates actuation of the Z-axis actuator to digital force signals resulting from the actuation.

2. The method of claim 1, additionally comprising: (G) calculating, by the force-measuring device controller, calibration data; and (H) storing, by the force-measuring device controller, the calibration data in the force-measuring device.

3. The method of claim 2, wherein the calibration data comprises: (1) a ratio of a characteristic amplitude of the digital transducer data to a characteristic amplitude of the digital force signals; or (2) a ratio of a characteristic amplitude of the digital force signals to a characteristic amplitude of the digital transducer data.

4. The method of claim 1, wherein:
the sample is an electronic apparatus;
the electronic apparatus comprises a microprocessor and a memory electronically coupled to the microprocessor; and
the microprocessor functions as the force-measuring device controller.

5. The method of claim 1, wherein the force-measuring device is a packaged integrated circuit.

6. The method of claim 5, wherein the force-measuring device comprises piezoelectric micromechanical force-measuring elements (PMFEs).

7. The method of claim 1, wherein the Z-axis actuator comprises a stepper motor.

8. The method of claim 1, wherein the first signal processing circuitry of the load cell comprises an instrumentation amplifier.

9. The method of claim 1, wherein:
the load cell is a first load cell;
the force signals are first force signals;
the amplified force signals are first amplified force signals;
the force-measuring device testing system additionally comprises: a second load cell secured to the slider, such that actuation of the Z-axis actuator is mechanically coupled to a vertical movement of the second load cell via the slider, the first load cell and the second load cell being oriented in opposite directions along a vertical axis; and
the first signal processing circuitry of the load cell is electronically coupled to the second load cell, configured to measure force signals at the second load cell and output second amplified force signals to the controller.

10. The method of claim 9, wherein:
the sub-step (D4) additionally comprises: measuring, by the first signal processing circuitry of the load cell, second force signals at the second load cell and amplifying the second force signals; and
the sub-step (D5) additionally comprises: outputting, by the first signal processing circuitry of the load cell, second amplified force signals to the controller.

11. The method of claim 10, wherein the sub-step (D6) comprises: converting the first amplified force signals to first digital force signals, converting the second amplified force signals to second digital force signals, and subtracting the second digital force signals from the first digital force signals to obtain the digital force signals.

12. The method of claim 9, wherein the step (C) of obtaining a desired force-trajectory comprises the sub-steps of:
(C1) receiving, by the second load cell, a manual force input while the first load cell, the second load cell, and the slider are configured to be stationary during a manual input mode;
(C2) measuring, by the first signal processing circuitry of the load cell, second force signals at the second load cell and amplifying the second force signals;
(C3) outputting, by the first signal processing circuitry of the load cell, second amplified force signals to the controller;
(C4) obtaining, by the controller, digital force signals in accordance with the second amplified force signals; and
(C5) determining, by the controller, the desired force trajectory in accordance with the digital force signals.

13. The method of claim 1, wherein the at least one elastic member comprises a first elastic member and a second elastic member, the first elastic member and the second elastic member being arranged in series between the load cell and the force-measuring device.

14. The method of claim 13, wherein first elastic member is less elastic than the second elastic member.

15. The method of claim 13, wherein the first elastic member comprises a spring.

16. The method of claim 13, wherein second elastic member comprises a rubber block.

* * * * *